US012570166B1

(12) United States Patent
Sylvester et al.

(10) Patent No.: US 12,570,166 B1
(45) Date of Patent: Mar. 10, 2026

(54) APPARATUS FOR WIRELESS BATTERY CHARGER HEAT MANAGEMENT

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

( * ) Notice: Subject to any disclaimer, the term of this patent is extended or adjusted under 35 U.S.C. 154(b) by 612 days.

(21) Appl. No.: 18/167,528

(22) Filed: Feb. 10, 2023

(51) Int. Cl.
| | |
|---|---|
| B60L 53/12 | (2019.01) |
| H02J 50/10 | (2016.01) |
| H02J 50/40 | (2016.01) |
| H02J 50/70 | (2016.01) |

(52) U.S. Cl.
CPC .............. B60L 53/12 (2019.02); H02J 50/10 (2016.02); H02J 50/40 (2016.02); H02J 50/70 (2016.02)

(58) Field of Classification Search
CPC . B60L 53/12; H02J 50/10; H02J 50/40; H02J 50/70
USPC .......................................................... 320/108
See application file for complete search history.

(56) References Cited

U.S. PATENT DOCUMENTS

| | | | | | |
|---|---|---|---|---|---|
| 8,383,992 | B2 * | 2/2013 | Wang | ........................ | H05B 3/56 |
| | | | | | 219/490 |
| 8,561,770 | B2 * | 10/2013 | Stoicoviciu | ............ | B60M 7/003 |
| | | | | | 307/104 |
| 9,969,282 | B2 * | 5/2018 | van Boheemen | ..... | B60L 53/122 |
| 10,563,507 | B2 * | 2/2020 | Tessien | ..................... | B61B 1/00 |
| 11,005,285 | B2 * | 5/2021 | Partovi | .................. | H04B 5/263 |
| 12,083,933 | B2 * | 9/2024 | Boys | .......................... | H01F 5/00 |
| 12,139,030 | B1 * | 11/2024 | Booth | ..................... | B60L 53/36 |
| 12,246,604 | B1 * | 3/2025 | Sylvester | ................ | H02J 50/10 |
| 2016/0181849 | A1 * | 6/2016 | Govindaraj | ........... | H02J 7/0044 |
| | | | | | 320/108 |
| 2017/0274778 | A1 * | 9/2017 | van Boheemen | ....... | H01F 27/36 |
| 2019/0023135 | A1 * | 1/2019 | Boys | ........................ | H01F 38/14 |
| 2023/0122088 | A1 * | 4/2023 | Mccool | ................... | H02J 50/40 |
| | | | | | 320/108 |

OTHER PUBLICATIONS

Soares et al., "A Study on Renewed Perspectives of Electrified Road for Wireless Power" (Year: 2022).*

* cited by examiner

*Primary Examiner* — M Baye Diao
(74) *Attorney, Agent, or Firm* — Fredrikson & Byron, P.A.

(57) ABSTRACT

A roadway section comprises a body, a wireless battery charger, a reinforcement layer, and a thermal conduction coupler. The body includes rigid pavement. The reinforcement layer is embedded in the body and is configured to provide structural integrity to the body. The wireless battery charger is embedded in the body and configured to induce an electrical charge on a battery of a vehicle traveling on the roadway section. The thermal conduction coupler is embedded in the body and extends between the wireless battery charger and a portion of the reinforcement layer. The thermal conduction coupler is configured to conductively transfer heat from the wireless battery charger to the reinforcement layer.

20 Claims, 17 Drawing Sheets

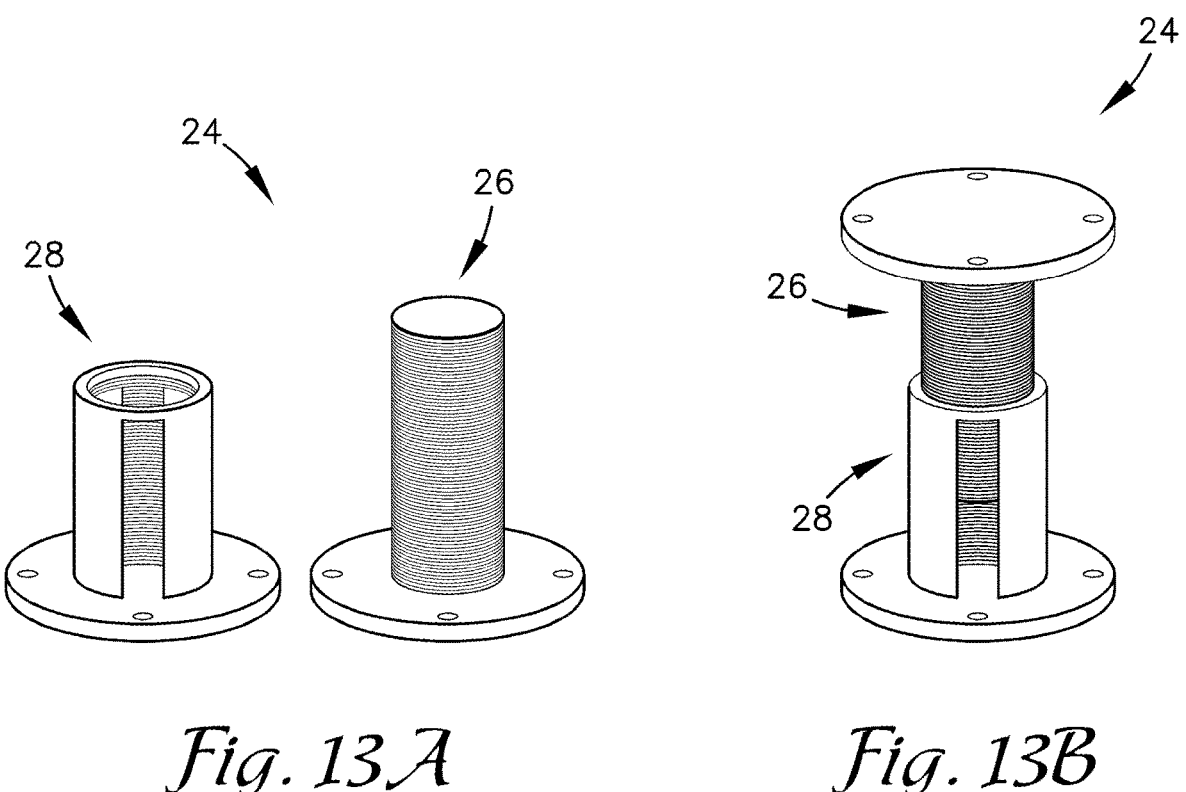
*Fig. 13A*          *Fig. 13B*
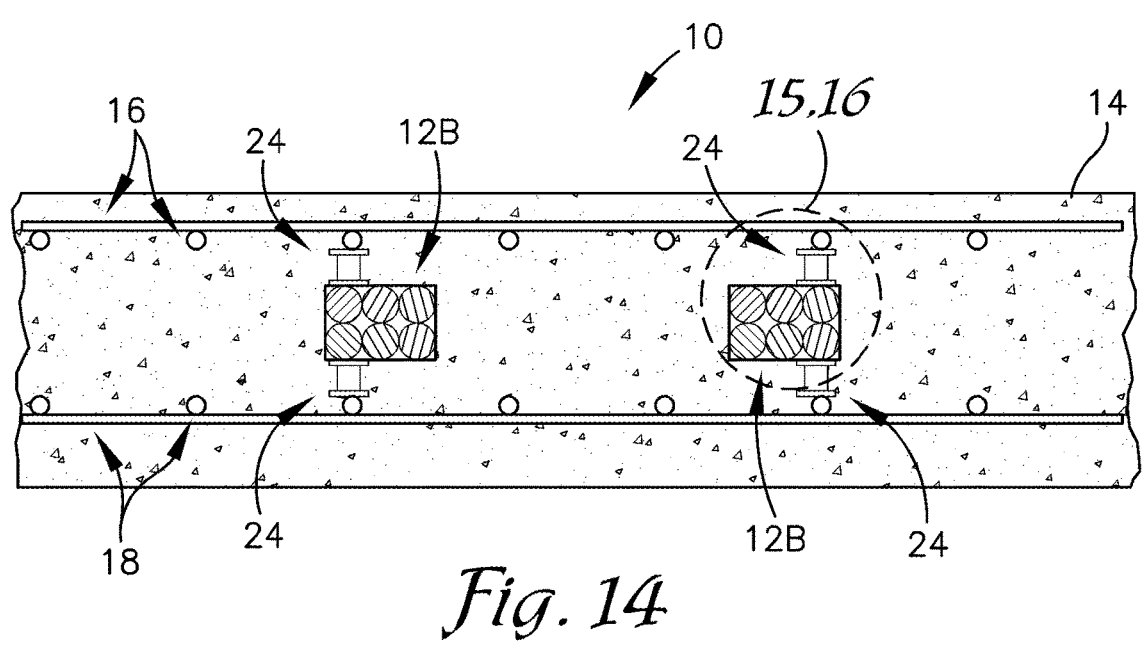
*Fig. 14*

APPARATUS FOR WIRELESS BATTERY CHARGER HEAT MANAGEMENT

CROSS-REFERENCE TO RELATED APPLICATIONS

The present application is filed contemporaneously with identically-titled U.S. patent application Ser. No. 18/167, 576, entitled APPARATUS FOR WIRELESS BATTERY CHARGER HEAT MANAGEMENT, filed Feb. 10, 2023, the entire disclosure of which is hereby incorporated by reference herein.

FIELD OF THE INVENTION

Embodiments of the current invention relate to apparatuses for managing heat dissipation from a wireless battery charger accompanying a modular roadway system.

BACKGROUND

Next generation roadway systems may include wireless battery chargers for electric vehicles traveling on them. Roadway system maintenance is notoriously difficult to target, and expensive to implement. It is not known how future road maintenance methodologies will accommodate inclusion of wireless battery chargers. There is a need for ameliorating one or more challenges that may arise in roadway maintenance and with roadway longevity for such future systems.

SUMMARY OF THE INVENTION

Embodiments of the current invention address one or more of the above-mentioned problems and provide a distinct advance in the art of temperature management in a roadway section in a modular roadway system. Specifically, embodiments of the current invention provide a plurality of thermal conduction couplers which transfer thermal energy from the wireless battery chargers to other components of the roadway section, such as reinforcement layers or leveling feet, to enhance or improve heat dissipation. The roadway section comprises a body, the reinforcement layer, the wireless battery charger, and the thermal conduction coupler. The body includes rigid pavement. The reinforcement layer is embedded in the body and is configured to provide structural integrity to the body. The wireless battery charger is embedded in the body and configured to induce an electrical charge on a battery of a vehicle traveling on the roadway section. The thermal conduction coupler is embedded in the body and extends between the wireless battery charger and a portion of the reinforcement layer. The thermal conduction coupler is configured to conductively transfer heat from the wireless battery charger to the reinforcement layer.

Another embodiment of the current invention provides a roadway section comprising a body, a wireless battery charger, an upper reinforcement layer, a lower reinforcement layer, a plurality of first rebar chairs, and a plurality of second rebar chairs. The body includes rigid pavement. The wireless battery charger is embedded in the body and spaced apart from the reinforcement layer. The wireless battery charger is configured to induce an electrical charge on a battery of a vehicle traveling on the roadway section. The upper reinforcement layer is embedded in the body and positioned above the wireless battery charger. The upper reinforcement layer is formed from non-ferrous material and is configured to provide structural integrity to the body. The lower reinforcement layer is embedded in the body and positioned below the wireless battery charger. The lower reinforcement layer is configured to provide structural integrity to the body. The first rebar chairs are embedded in the body. Each first rebar chair is formed from non-ferrous material and is configured to conductively transfer heat from the wireless battery charger to the upper reinforcement layer. The second rebar chairs are embedded in the body. Each second rebar chair configured to conductively transfer heat from the wireless battery charger to the lower reinforcement layer.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the current invention are described in detail below with reference to the attached drawing figures, wherein:

FIG. 13A is a perspective view of a bolt component and a nut component of a curing leveling foot;

FIG. 13B is a perspective view of the bolt component and the nut component coupled together;

FIG. 14 is a side sectional view of a portion of the roadway section cut along line 14-14 of FIG. 8 illustrating curing leveling feet;

Figure 1:
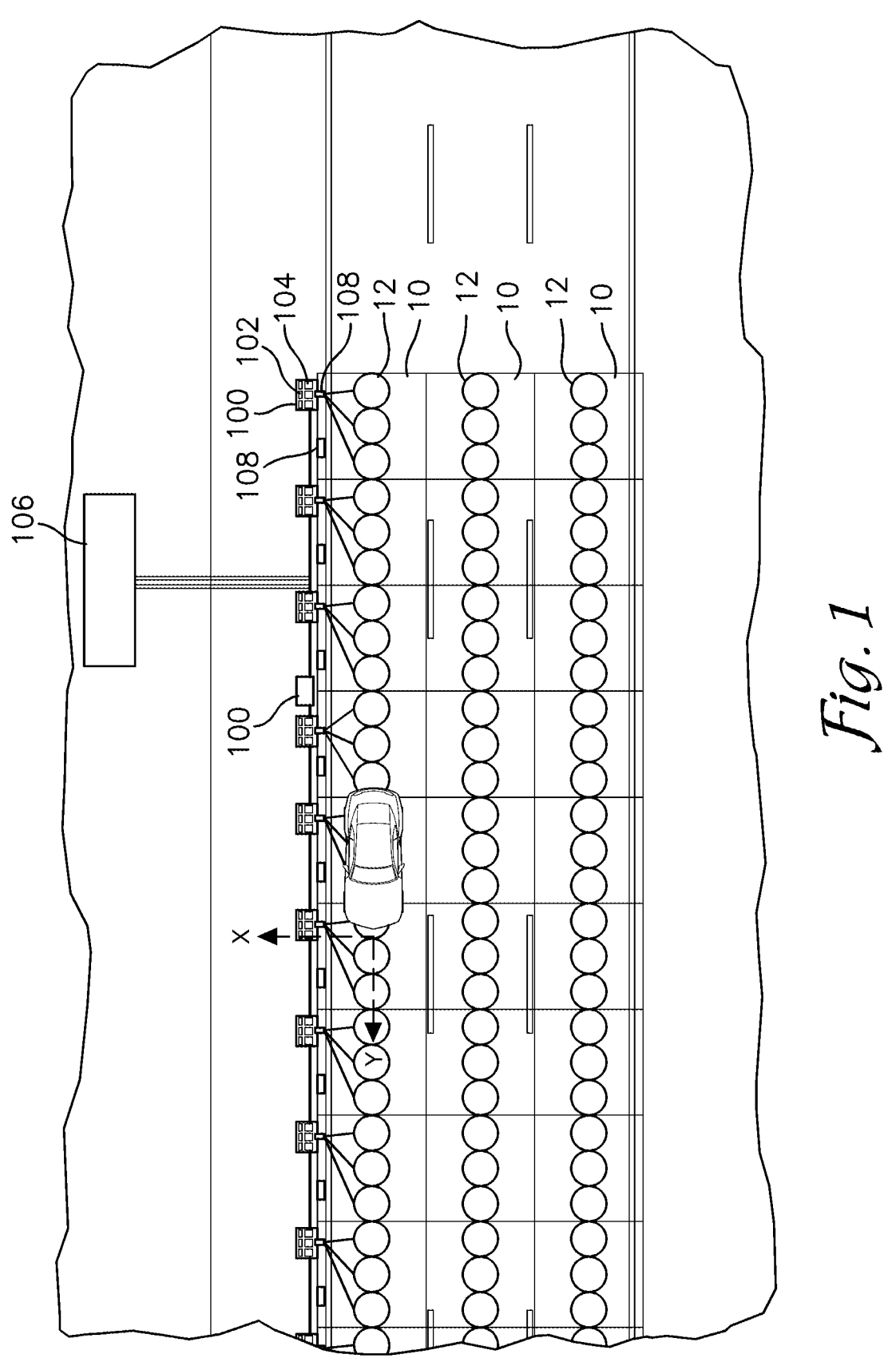
FIG. 1 is a top plan view of a modular pavement system comprising a plurality of roadway sections.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the technology references the accompanying drawings that illustrate specific embodiments in which the technology can be practiced. The embodiments are intended to describe aspects of the technology in sufficient detail to enable those skilled in the art to practice the technology. Other embodiments can be utilized and changes can be made without departing from the scope of the current invention. The following detailed description is, therefore, not to be taken in a limiting sense. The scope of the current invention is defined only by the appended claims, along with the full scope of equivalents to which such claims are entitled.

Relational and/or directional terms, such as "above", "below", "up", "upper", "upward", "down", "downward", "lower", "top", "bottom", "outer", "inner", etc., along with orientation terms, such as "horizontal" and "vertical", may be used throughout this description. These terms retain their commonly accepted definitions and are used with reference to embodiments of the technology and the positions, directions, and orientations thereof shown in the accompanying figures. Embodiments of the technology may be positioned and oriented in other ways or move in other directions. Therefore, the terms do not limit the scope of the current technology.

FIG. 1 illustrates an exemplary pavement system in accordance with embodiments of the present invention. The system includes a plurality of roadway sections 10 aligned along a longitudinal or y-axis corresponding to a direction of travel of vehicles or other masses across top surfaces of the roadway sections 10. The system includes three (3) lanes, each being respectively formed from a plurality of roadway sections 10 aligned along the y-axis. Each lane may include one or more roadway sections, each of which may include one or more roadway sections 10. It is foreseen that the pavement system may include more or fewer lanes without departing from the spirit of the present invention.

The roadway sections 10 may be pre-cast slabs comprising concrete paving material, described in the exemplary embodiment in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Each roadway section 10 of the illustrated embodiment includes three (3) wireless battery chargers 12. The wireless battery chargers 12 may include or comprise wireless charge emitters and/or transceivers. Each wireless charge emitter and/or transceiver preferably includes one or more coil(s) or layers of conductive material configured to conduct current of supplied power in a spatial pattern that generates and projects an electromagnetic (EMF) field extending up and above the top surface of the corresponding roadway section for wireless battery charging of passing vehicles (e.g., according to Faraday's law of induced voltage). Each of the wireless battery chargers 12 may be configured for unidirectional charging of batteries of vehicles passing along a top surface of the roadway sections 10 or for bidirectional charging in communication with electrical circuits positioned on or adjacent to the top surface of the slabs. One of ordinary skill will appreciate that an individual slab or roadway section may include more or fewer wireless chargers, at different and/or variable e spacing and/or of different configuration/shape, without departing from the spirit of the present invention.

Figure 5:
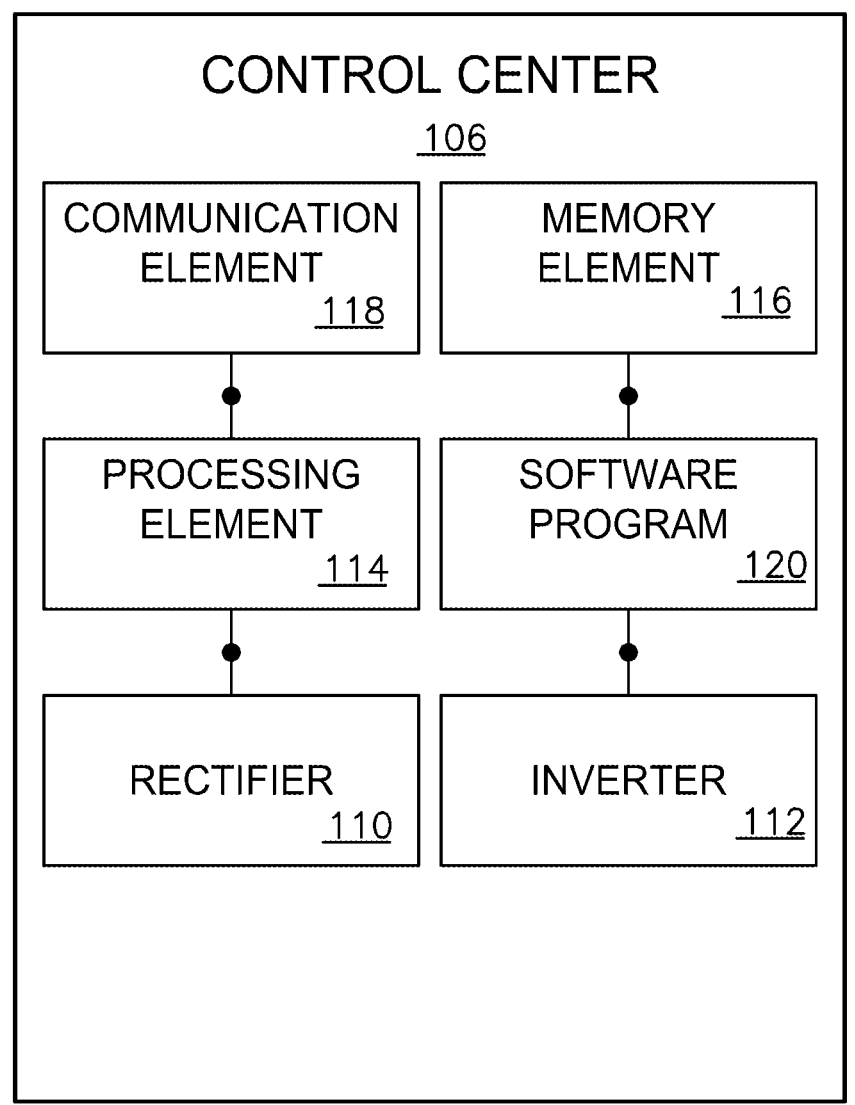
FIG. 5 is a schematic block diagram of a plurality of electronic components utilized in connection with operation of one or more roadways sections.

Power to the wireless battery chargers 12 is supplied, conditioned, tuned, transformed, converted and/or otherwise changed and/or controlled by one or more control centers 106. Turning briefly to FIG. 5, each control center 106 may include a rectifier 110, an inverter 112, a processing element 114, a memory element 116, a communication element 118, and a software program 120, each of which is discussed in more detail below. It should also be noted that one or more components of a control center may be housed remotely and/or embedded in or with components of a roadway section without departing from the spirit of the present invention.

The control center 106 receives power from a power supply such as a public utility line and/or from upstream switchgear (not shown), and prepares same for supply to the wireless battery chargers 12. For example, in one or more embodiments, the control center 106 receives alternating current (AC) power at 750 KW and 110 A, and increases the frequency of the power using the rectifier 110 and inverter 112 for supply to the wireless battery chargers 12.

The control center 106 may initially supply power to junction boxes 100. The switching device(s) 102 and corresponding tuning network device(s) 104 may serve as intermediate components for electrical communication between the wireless battery chargers 12 and the control center 106. One of ordinary skill will appreciate that more, fewer and/or different intermediate components may be used to supply power to wireless chargers without departing from the spirit of the present invention. The exemplary junction boxes 100 are adjacent the sides of the corresponding roadway sections 10 and may be set or embedded in a shoulder of the roadway, with top portions approximately flush with the top surface of the roadway to provide periodic access thereto for maintenance.

Each junction box 100 may contain or include one or more switching device(s) 102 and corresponding tuning network device(s) 104, with each pair of switching device 102 and tuning network device 104 supplying power to one of the wireless battery chargers 12. The switching device 102 may, for example, be a metal-oxide-semiconductor field-effect transistor (MOSFET) switch or any other switch device for switching and/or amplifying the power signal to the corresponding wireless battery charger 12. The tuning network device 104 may, for example, be a transformer configured to increase or decrease the voltage and/or other characteristics of the power for supply to the corresponding wireless battery charger 12. The wires or conductors carrying the power to the wireless battery chargers 12 may be routed through one or more conduits and/or edge connectors 108 illustrated in FIG. 1.

In one or more embodiments, the processing element 114, the memory element 116, the communication element 118 and/or the software program 120 comprise a master controller. The master controller may be in electronic communication (e.g., via the communication element 118) with one or both of the switching device 102 and/or tuning network device 104 corresponding to each of the wireless battery chargers 12. The electronic communication may permit such electronic devices in each of the junction boxes 100 to provide data regarding operation and/or faults of the wireless battery chargers 12 and/or supporting power supply or control infrastructure and/or intermediate components. The electronic communication may also or alternatively permit the master controller to communicate commands to the junction box 100 electronic components and/or components of the wireless battery chargers 12, for example where the master controller commands one or more switching device (s) 102 to power or shut down power to the corresponding wireless charger(s) 12 or commands one or more network tuning device(s) 104 to increase or decrease the voltage of the power supplied to the corresponding wireless charger(s) 12.

Figure 2:
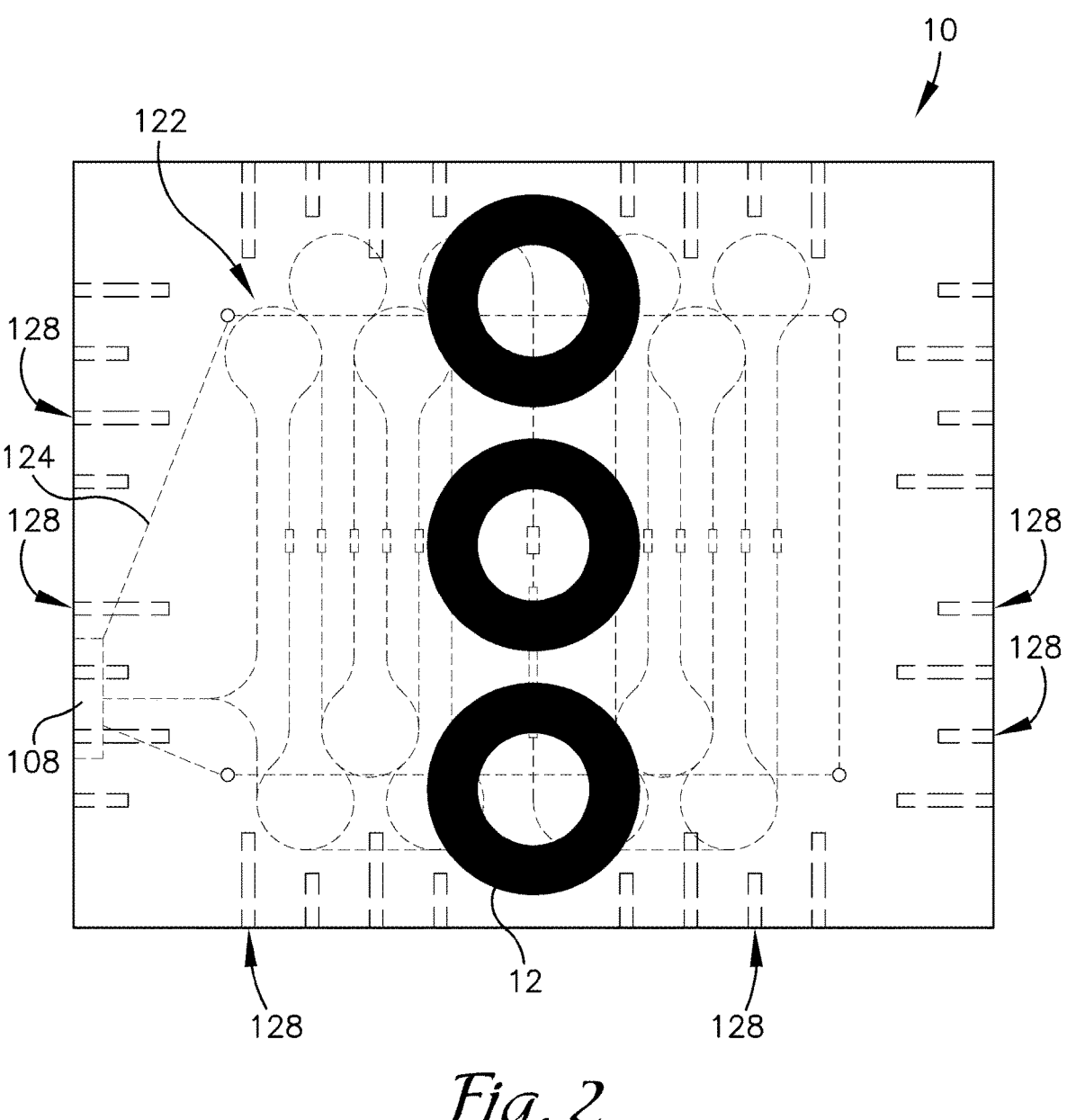
FIG. 2 is a top schematic view of a roadway section including a plurality of wireless battery chargers, among other components.

Turning to FIG. 2, in one or more embodiments each roadway section 10 includes a strain sensor array 122. The strain sensor array 122 is distributed at least partly, and preferably mostly, across the length and width of a body 14 of the roadway section 10. The strain sensor array 122 may include one or more optical fiber sensors. The strain sensor array 122 may embody optical fiber sensing technologies including but not limited to one or more of Rayleigh, Brillouin, Raman, or Fiber Bragg Grating (FBG) technologies, with corresponding sensors or sampling area(s) distributed along the length of the fiber(s).

In one or more embodiments comprising FBGs, the FBGs are positioned in the optical fiber with selectable space therebetween. Each FBG, or any other method implemented as described above but not limited to those specifically named, provides a measurement of the strain of its surrounding environment, which is a local volume, element or region of the body 14. It should be noted that emitters and receivers of optical fiber sensors may comprise a single device or multiple devices. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG. One of ordinary skill will appreciate that various mechanisms for detecting strain-including mechanisms for detecting strain using other optical fiber sensing technologies—may be employed in the strain sensor array 122 within the scope of the present invention.

The optical fibers of the array 122 shown in FIG. 2 are implemented in elongated loops with enlarged turns on each end, with the loops being arranged in an alternating pattern offset relative to adjacent loops along the y-axis. However, one of ordinary skill will appreciate that sensors may be implemented within a body of pavement material in other patterns—for example, in a serpentine pattern layout, a coil pattern layout, a grid pattern, an array of individual fiber optic lines, or other geometric pattern layouts-without departing from the spirit of the present invention. Moreover, a sensor array may include more or fewer optical fibers and/or may comprise additional or alternative strain sensors (e.g., piezoelectric strain sensors) without departing from the spirit of the present invention.

The sensor array 122 may include and/or be in communication with supporting components-such as an embedded interrogator-within the scope of the present invention. For example, embodiments of the present invention are interoperable with the paving systems and sensor array(s) described in U.S. Patent Publication 2021/0222375 A1 to Sylvester, filed Apr. 9, 2021, which is hereby incorporated by reference herein in its entirety. In one or more embodiments, the control center 106 is in electronic communication (e.g., via the communication element 118) with an interrogator which, in turn, operates in conjunction with the fiber optic sensors of the sensor array 122 to generate sensor data.

Figure 4:
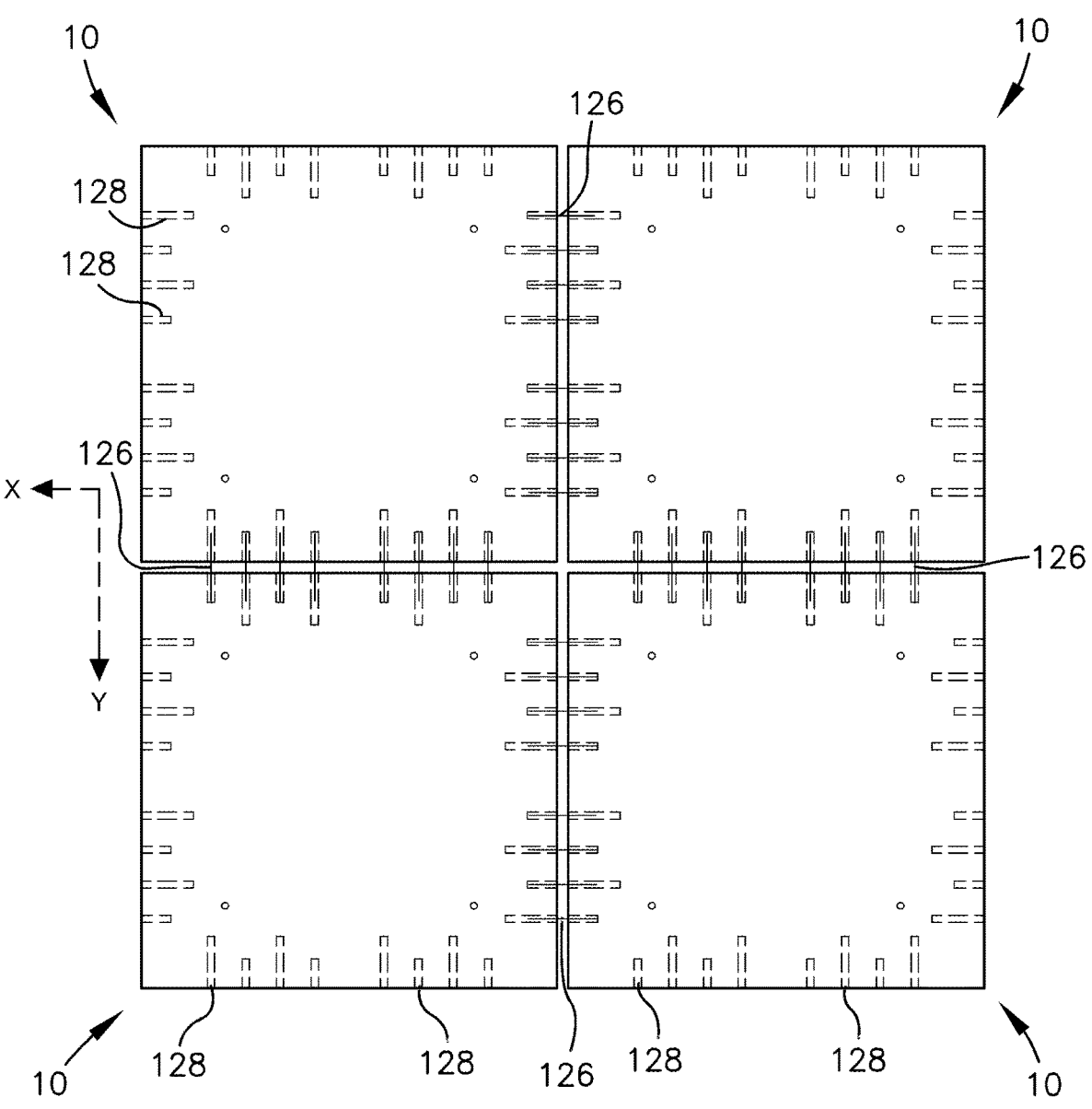
FIG. 4 is a top schematic view of four roadway sections illustrating a plurality of connections between adjacent roadway sections.

Turning briefly to FIG. 4, the roadway sections 10 of the illustrated embodiment also include structural links comprising load-transferring connectors 126 (e.g., dowel rods), discussed in more detail below. However, it should be noted that the paving material of the roadway and delineations between sections or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention.

In one or more embodiments, a sensing volume of a section of pavement may comprise an area of the roadway monitored by a sensor array comprising fiber optic cable(s) and one or more interrogator(s), where each interrogator transmits and receives optical signals reflecting stress and strain in the section. In one or more embodiments, a sensing volume of a section of pavement comprises an area of the roadway delineated by physical boundaries comprising the sides of a precast slab or a combination of saw cut joints and sides of a cast-in-place concrete installation.

An advantage of the precast roadway sections 10 of the illustrated embodiment is realized through added data dimensionality available through monitoring condition and/or strains across multiple sensor arrays 122 respectively corresponding to multiple roadway sections 10 with load-transferring connectors 126 extending therebetween.

However, it is also foreseen that a sensor array may be omitted, alternatively configured or replaced by other sensing technologies without departing from the spirit of the present invention.

Returning to FIG. 1, the master controller of the control center 106 may additionally be in electronic communication (e.g., via wired connections 124 of FIG. 2) with and may receive strain sensor data from the strain sensor arrays 122 embedded in the roadway sections 10. The wired connections 124 may be routed via edge connectors 108 through one or more junction boxes 100 illustrated in FIG. 1 for communication to the master controller. The master controller may analyze the strain sensor data, alone and/or in communication with one or more remote server(s), to determine vehicle position on the pavement system and roadway sections and, accordingly, provide commands for activation/deactivation of the wireless battery chargers 12 and/or increasing or decreasing the voltage supplied to the wireless battery chargers 12.

The communication element 118 generally allows communication with systems or devices external to the control center 106. The communication element 118 may include signal or data transmitting and receiving circuits, such as antennas, amplifiers, filters, mixers, oscillators, digital signal processors (DSPs), and the like. The communication element 118 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 118 may establish communication through connectors or couplers that receive metal conductor wires or cables which are compatible with networking technologies such as ethernet. The communication element 118 may also couple with optical fiber cables, e.g., via an interrogator. The communication element 118 may be in communication with or electronically coupled to memory element 116 and/or processing element 114.

Preferably the devices of the pavement system communicate via secure and/or encrypted communication means. For example, all or some of the roadway sections 10, the control center 106 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 116 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 116 may include, or may constitute, a "computer-readable medium." The memory element 116 may store the instructions, code, code segments, software, firmware, programs, applications, apps, services, daemons, or the like that are executed by the processing element 114, such as the software program 120. The memory element 116 may also store settings, data, documents, files, photographs, movies, images, databases, and the like, for example where such data is captured by additional infrastructure sensors and/or relates to utilization of the wireless battery chargers 12 by passing vehicles.

The processing element 114 may include processors, microprocessors, microcontrollers, DSPs, field-programmable gate arrays (FPGAs), analog and/or digital application-specific integrated circuits (ASICs), or the like, or combinations thereof. The processing element 114 may include digital processing unit(s). The processing element 114 may generally execute, process, or run instructions, code, code segments, software, firmware, programs, applications, apps, processes, services, daemons, or the like. The processing element 114 may also include hardware components, such as finite-state machines, sequential and combinational logic, and other electronic circuits that may perform the functions necessary for the operation of embodiments of the present invention. For example, the processing element 114 may execute the software program 120, where the software program 120 includes computer-readable instructions instructing the processing element 114 to complete all or some of the steps described herein. The processing element 114 may be in communication with the other electronic components through serial or parallel links that include address busses, data busses, control lines, and the like.

Figures 3A, 3B:
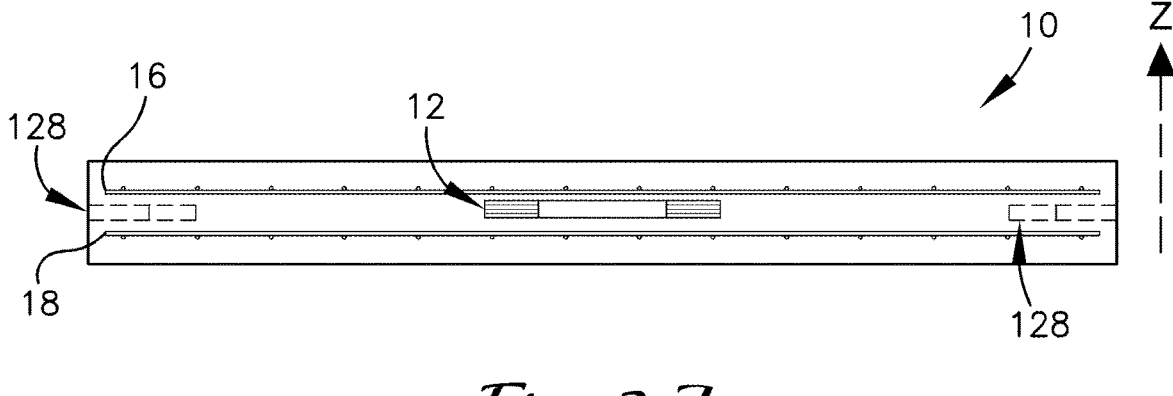
FIG. 3A is a cross-sectional view of one of the roadway sections of FIG. 1, cut along a vertical plane through one of the wireless battery chargers and further illustrating an upper reinforcement layer and a lower reinforcement layer.
FIG. 3B is a cross-sectional view of an alternative roadway section from the pavement system of FIG. 3A, particularly illustrating a plurality of reinforcement layers positioned below the wireless battery charger and omitting layer(s) positioned above the charger.

The roadway sections 10 may also each include one or more internal reinforcement layer(s) 16, 18 which are embedded in the body 14 (see FIG. 3A). Exemplary embodiments of the roadway section 10 include an upper reinforcement layer 16 and a lower reinforcement layer 18.

Each reinforcement layer 16, 18 may comprise at least one layer of steel reinforcement bar (rebar) lattice or other internal reinforcement structures positioned in a grid pattern with a plurality of spaced apart reinforcement bars oriented in a first direction overlaying a plurality of spaced apart reinforcement bars oriented in a second direction, preferably orthogonal to the first direction. The reinforcement layers 16, 18 may additionally or alternatively be formed from materials such as fiberglass reinforcement mat, geotechnical mat, composite bars, carbon fiber mat, or loose reinforcement material such as fiberglass fibers, carbon fibers, plastic fibers, or metallic shavings. In one or more embodiments, the upper reinforcement layer 16 is embedded nearer to the top surface of the roadway section than the wireless battery charger(s) 12 and comprises only those materials listed above or otherwise which are non-metallic, non-ferrite material(s) and through which the electromagnetic field (EMF) emitted upward from the wireless battery chargers 12, which are positioned below the upper reinforcement layer 16, will pass unimpeded. Such an upper reinforcement layer 16 will not substantially interfere with, shield against, insulate and/or isolate the EMF emitted upward from the wireless battery chargers 12. In other words, such an upper reinforcement layer 16 is generally transmissive to the EMF from the wireless battery chargers 12, preferably comprising non-magnetic shielding materials discussed in more detail below.

In one or more embodiments, a minimum distance between the upper reinforcement layer 16 and one or more of the wireless battery chargers 12 is less than one (1) inch. Where the lower reinforcement layer 18 comprises materials listed above which are metallic, ferrous and/or electrically conductive, the minimum distance between the reinforcement layer 18 and any of the wireless battery chargers 12 may be at least one (1) inch or at least three (3) inches. More broadly, it is foreseen that embodiments of the present inventive concept are interoperable with the paving systems and apparatuses described in U.S. Patent Publication No. 2016-0222594 A1 to Sylvester (filed Mar. 30, 2016), and in U.S. Patent Publication No. 2017-0191227 A1 to Sylvester (filed May 16, 2016), each of which is hereby incorporated by reference herein in its entirety.

Broadly, it should be noted that a roadway section or slab may include one or more reinforcement grids or layers above and/or one or more reinforcement layers below the embedded wireless battery charger(s). Also or alternatively, reinforcement layers may be omitted from portion(s) above and/or from portion(s) below the wireless battery chargers within the scope of the present invention. For example, and with brief reference to FIG. 3B, in one or more embodiments a plurality of reinforcement layers, including an uppermost reinforcement layer 16' and a lower reinforcement layer 18', may be embedded below wireless battery charger 12', with no reinforcement layers being embedded above the wireless battery charger 12'. Such reinforcement layers may comprise magnetic shielding material and/or non-magnetic shielding material within the scope of the present invention. One of ordinary skill will appreciate that other variations on number and positioning of layers are within the scope of the present invention.

While it is foreseen, as noted above, that embodiments of the present invention may be constructed in the field—for example as part of cast-in-place concrete or continuous pour asphalt installations—or be pre-fabricated into an assembly that can be installed onsite, it is preferred that the strain sensor array 122 be encased and permanently fixed within body 14 during an offsite pre-fabrication process. The optical fiber sensors of the exemplary array 122 may be laminated and/or fixed to one or more sides of a reinforcement layer 16, 18 (fixed relationship not shown, but see, e.g., FIGS. 2-4 of U.S. Patent Publication No. 2017/0191227A1 incorporated by reference herein) of the roadway section 10 during fabrication, essentially extending in a substantially horizontal (XY) plane and/or generally parallel to a plane defined by a top surface of the body 14 of the section 10 and at a given height within the body 14.

More preferably, the sensors of the array 122 may be laminated and/or fixed to a bottom side of the lower or bottommost reinforcement layer 18 of the roadway section 10. Placement near the bottom of the body 14 may provide greater resolution from and/or amplification of data collected by the strain sensor array 122. Moreover, fixing the strain sensor array 122 to a reinforcement layer 16 and/or 18 may generate a more holistic data set representing changes in form across the entire body 14 because a preferred reinforcement layer 16, 18 will extend across substantially the entire length and width of the body 14 and may be less susceptible to localized distortions resulting from pockets or imperfections in the body 14.

It is foreseen that all or portions of a strain sensor array 122 may be encased at different and/or varying heights within a slab without departing from the spirit of the present inventive concept. For instance, disposing at least one sensor at a different height within the roadway section 10—such as vertically above or below a second sensor—may provide additional resolution for detecting defects in the roadway section 10. However, long dimensions of the exemplary optical fiber sensors are preferably in substantial alignment with a direction of travel, for example along the y-axis, which may improve detection of vehicular load progression across a top surface of the roadway section 10. Dimensions of optical fiber sensors that are transverse or perpendicular to the direction of travel may improve detection of the lateral position of such a vehicular load on the roadway section 10. It is foreseen that a preferable arrangement of optical fiber sensors, each sensor having a region of the pavement surface that it can optimally sense, and each sensor having an orientation that improves detection of the longitudinal or lateral position of the vehicle load and position, will result in a sensor layout presenting a grid of sensors oriented in the traverse and longitudinal dimensions such that their sensing areas overlap each other along the x and y axes to ensure that a maximum area of the pavement can be sensed simultaneously by one or more sensors (e.g., oriented to the direction of travel and/or lateral position of the vehicle load on the roadway section 10).

As noted above, in one or more embodiments, load-transferring connectors 126 (see FIG. 2) set in cavities 128 join the roadway sections 10 to one another along sides extending perpendicular to the direction of travel (i.e., in the "x" direction). In one or more embodiments, load-transferring connectors 126 also join the roadway sections 10 to one another along sides extending parallel to the direction of travel (i.e., in the "y" direction). The load-transferring connectors 126 may comprise, for example, dowel rods. However, in one or more embodiments, roadway sections 10 adjacent one another in the "x" direction may be joined using tie bars (not shown) or other load-transferring connectors. Interfaces between roadway sections 10 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Figures 6, 7:
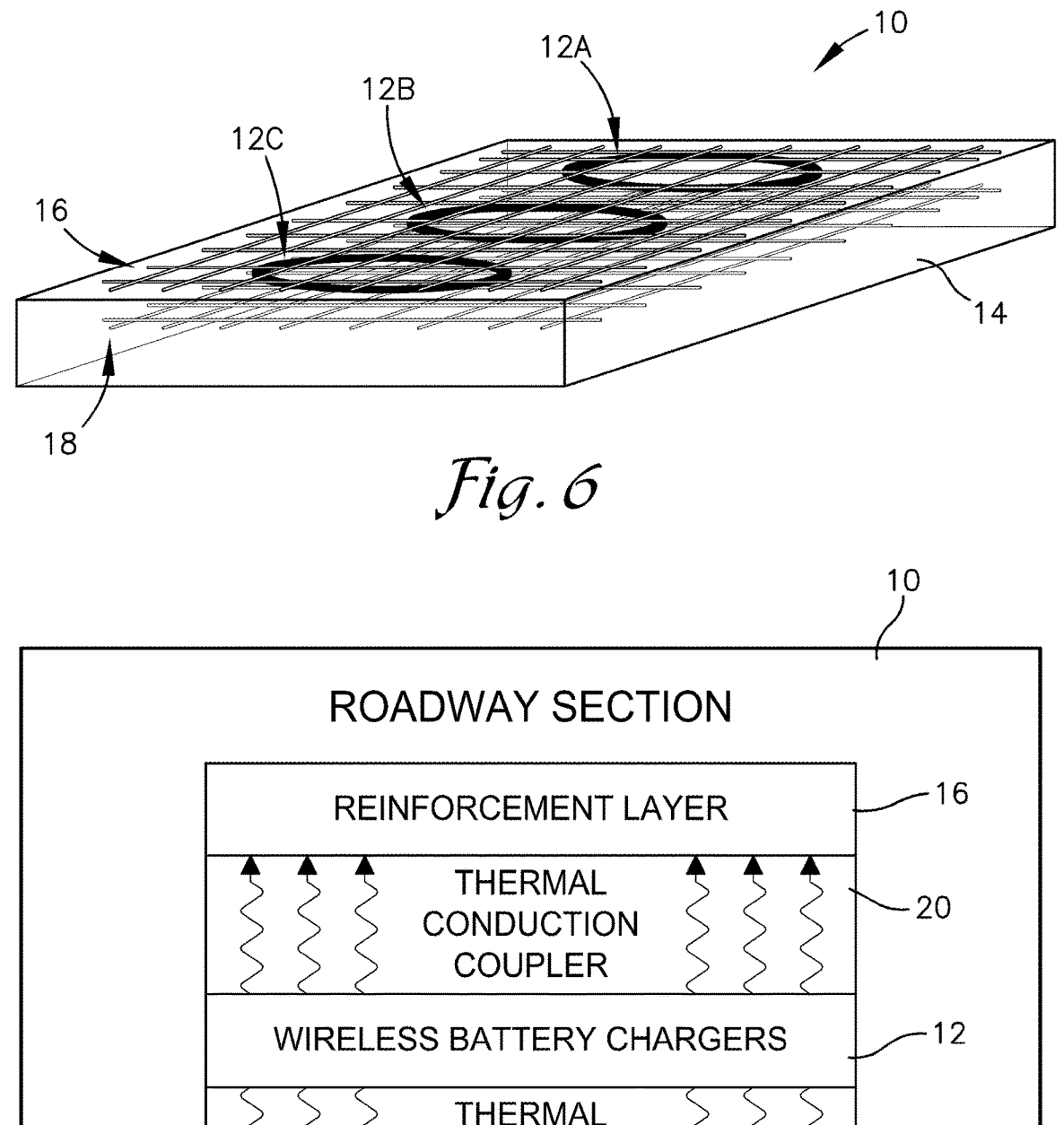
FIG. 6 is a perspective schematic view of a roadway section in accordance with an embodiment of the present invention.
FIG. 7 is a schematic block diagram of upper and lower reinforcement layers, thermal conduction couplers, and wireless battery chargers of the roadway section illustrating thermal energy flows therebetween.
Figure 8:
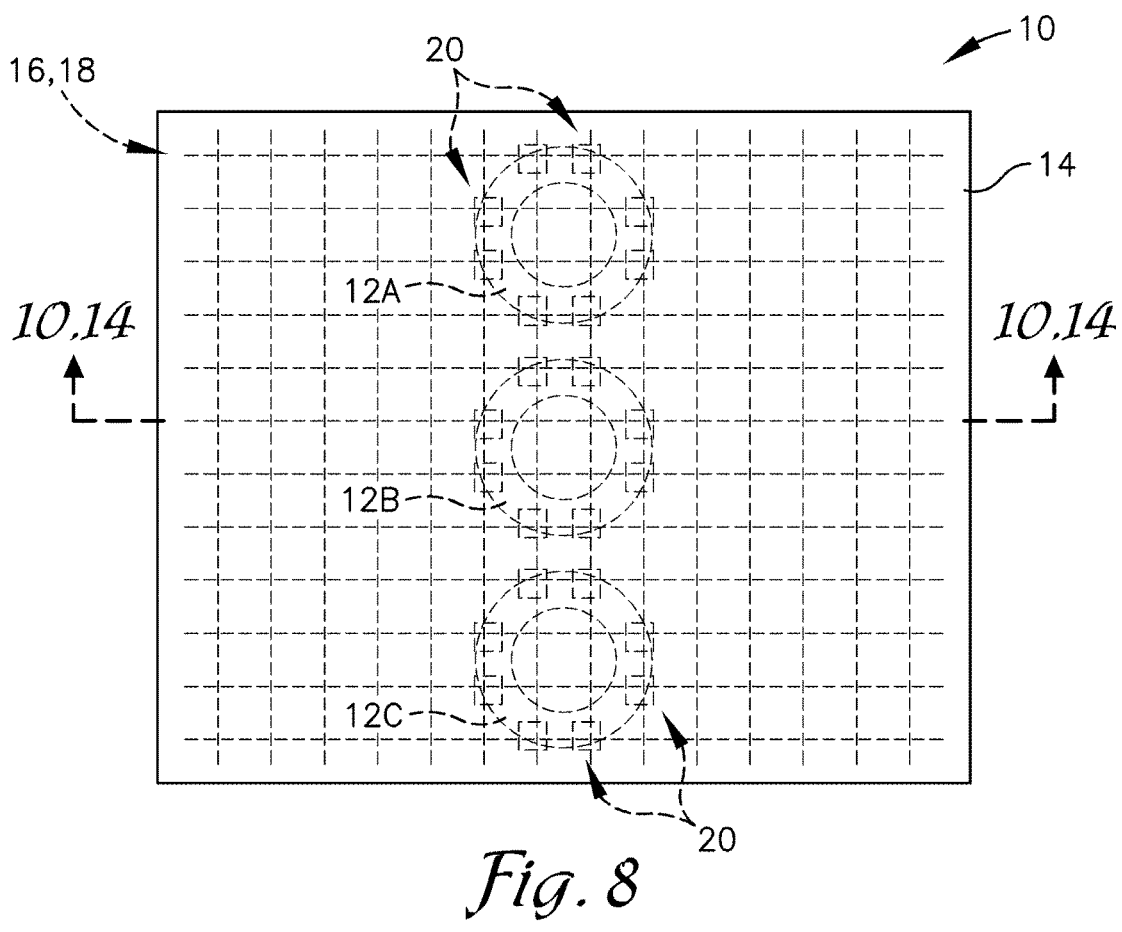
FIG. 8 is a top plan view of a roadway section illustrating various components embedded within a body of the roadway section in accordance with an embodiment of the present invention.

Referring to FIG. 6, a schematic view of roadway section 10 illustrates the wireless battery chargers 12, the upper reinforcement layer 16, and the lower reinforcement layer 18. During a vehicle charging operation of the roadway section 10, a large amount of electric current flows through the wireless battery chargers 12. Given that the electric current flows through resistive cabling of the wireless battery chargers 12, a large amount of heat is generated or emitted from the wireless battery chargers 12. The reinforcement layers 16, 18 may be formed from thermally conductive material and be operable to dissipate heat. In various embodiments as shown in FIGS. 7-23, the roadway section 10 also or alternatively comprises one or more thermal conduction couplers 20 which are utilized to transfer heat from the wireless battery chargers 12 to other components of the section 10, such as the reinforcement layers 16, 18. In some embodiments, each type of thermal conduction coupler 20 described below may be utilized by itself exclusively in the roadway section 10. In other embodiments, two or more types of the thermal conduction couplers 20 may be used in combination in the roadway section 10.

Generally, the thermal conduction coupler 20 is formed from "thermally conductive material," wherein "thermally conductive material" means a material within which heat freely flows, i.e., a material with a thermal conductivity (k) greater than about five (5) watts per meter-kelvin, greater than about fifteen (15) watts per meter-kelvin, or greater than about thirty (30) watts per meter-kelvin. Examples of thermally conductive materials include steel, iron, aluminum, ferrite, composites (such as resins, fibers, plastics, etc.), oils and waxes. Correspondingly the term "non-thermally conductive material" means a material within which heat does not freely flow, i.e., a material with a thermal conductivity less than five (5) watts per meter-kelvin, less than three (3) watts per meter-kelvin, or less than one (1) watt per meter-kelvin. Examples of non-thermally conductive materials include polymers. The material of the body 14, concrete or asphalt, for example, may have a thermal conductivity value ranging from 0.8-2.5 watts per meter-kelvin. Thus, the materials used to form the thermal conduction coupler 20 have a greater thermal conductivity than concrete. In one or more embodiments, the thermal conductivity of each thermal conduction coupler 20 is at least two (2) times, at least three (3) times, at least ten (10) times, or at least twenty (20) times greater than that of the pavement materials (e.g., concrete or asphalt) used to form the body of the section 10.

Referring to FIG. 7, thermal conduction couplers 20 are respectively positioned between a wireless battery charger 12 and the reinforcement layers 16, 18. In one or more embodiments, each thermal conduction coupler 20 is in contact with, or physically touching, one of the wireless battery chargers 12 and one of the reinforcement layers 16, 18. For example, in one or more embodiments, each of the wireless battery chargers 12 includes a conductive element for generating the magnetic field, the conductive element being covered by an outer, electrically insulating material or shroud comprising, e.g., rubber, resin or other polymer, or the like. The thermal conduction coupler 20 may be in contact with an exterior surface of such an insulating material or shroud. Also or alternatively, in one or more embodiments, each thermal conduction coupler 20 has a proximal end in proximity to or within a shortest distance from the corresponding wireless battery charger 12 and/or conductive element thereof of less than five (5) inches, less than three (3) inches, or less than one (1) inch, and a distal end in proximity to or within a shortest distance from the corresponding reinforcement layer 16 or 18 or leveling foot 32 (see discussion below) of less than five (5) inches, less than three (3) inches, or less than one (1) inch. Each thermal conduction coupler 20 generally transfers thermal energy from the wireless battery charger 12 through the thermal conduction coupler 20 and to the reinforcement layer 16, 18 to dissipate the heat generated by the wireless battery charger 12.

Referring to FIGS. 8, 10-12, and 14-16, respective ones of the illustrated thermal conduction couplers 20 are positioned on, and in contact with, an upper surface and a lower surface of each wireless battery charger 12. That is, a first group of the thermal conduction couplers 20 includes those positioned on, and in contact with, a first wireless battery charger 12A, a second group of the thermal conduction couplers 20 include those positioned on, and in contact with, a second wireless battery charger 12B, and a third group of the thermal conduction couplers 20 include those positioned on, and in contact with, a third wireless battery charger 12C. The thermal conduction couplers 20 positioned on the upper surface of each wireless battery charger 12 contact the upper reinforcement layer 16. In embodiments in which the upper reinforcement layer 16 includes a lattice or grid, each thermal conduction coupler 20 contacts at least one bar or elongated member of such a lattice or grid. In addition, the thermal conduction couplers 20 positioned on the upper surface of each wireless battery charger 12 are formed from non-ferrous material or other material which is thermally conductive but not magnetic shielding so that the magnetic field generated by the wireless battery charger 12 in the upward direction toward passing vehicles is not impeded, in accordance with the discussion below in connection with magnetic shielding materials.

As noted above, in one or more embodiments, one or more of the thermal conduction couplers 20 may also or alternatively be in proximity to, but not in direct contact with, the corresponding charger 12 surface and/or reinforcement layer 16 or 18 without departing from the spirit of the present invention.

As used herein, the term "magnetic shielding material" means any material exhibiting a relative magnetic permeability of at least four (4). In certain embodiments, the magnetic shielding material used will exhibit a relative magnetic permeability of at least at least eight (8), at least ten (10), at least one hundred (100), at least five hundred (500), or at least one thousand (1000). In certain preferred embodiments, such as when the magnetic shielding material comprises ferrite, the magnetic shielding material will have a relative permeability between fifteen hundred (1,500) and three thousand (3,000). Furthermore, in some embodiments, the magnetic shielding materials used herein may have a relative magnetic permeability that is at least four (4), at least eight (8), at least ten (10), at least one hundred (100), at least five hundred (500), or at least one thousand (1000) times greater than that of the material from which the bodies 14 of roadway sections 10 are formed (e.g., concrete). Examples of magnetic shielding materials include iron, steel, and ferrite. Correspondingly, the term "non-magnetic-shielding material" means any material exhibiting a relative magnetic permeability of less than four (4). Examples of non-magnetic-shielding material include aluminum, copper, brass, polymers, and fiberglass.

The thermal conduction couplers 20 positioned on the lower surface of each wireless battery charger 12 contact or are in proximity to the lower reinforcement layer 18, and each thermal conduction coupler 20 contacts or is in proximity to at least one reinforcement bar comprising the lower reinforcement layer 18. The thermal conduction couplers 20 positioned on the lower surface of each wireless battery charger 12 may be formed from virtually any thermally conductive material. In one or more embodiments, the thermal conduction couplers 20 are comprised of non-electrically conductive materials.

For each wireless battery charger 12, the thermal conduction couplers 20 are spaced apart and distributed around the inner circumference, the outer circumference, and/or therebetween on upper and lower surfaces of the charger 12. In some instances, the thermal conduction couplers 20 may be positioned as described and in alignment with various intersections of the reinforcement bars of the lattice or grid of the upper reinforcement layer 16 and/or the lower reinforcement layer 18.

Figure 9:
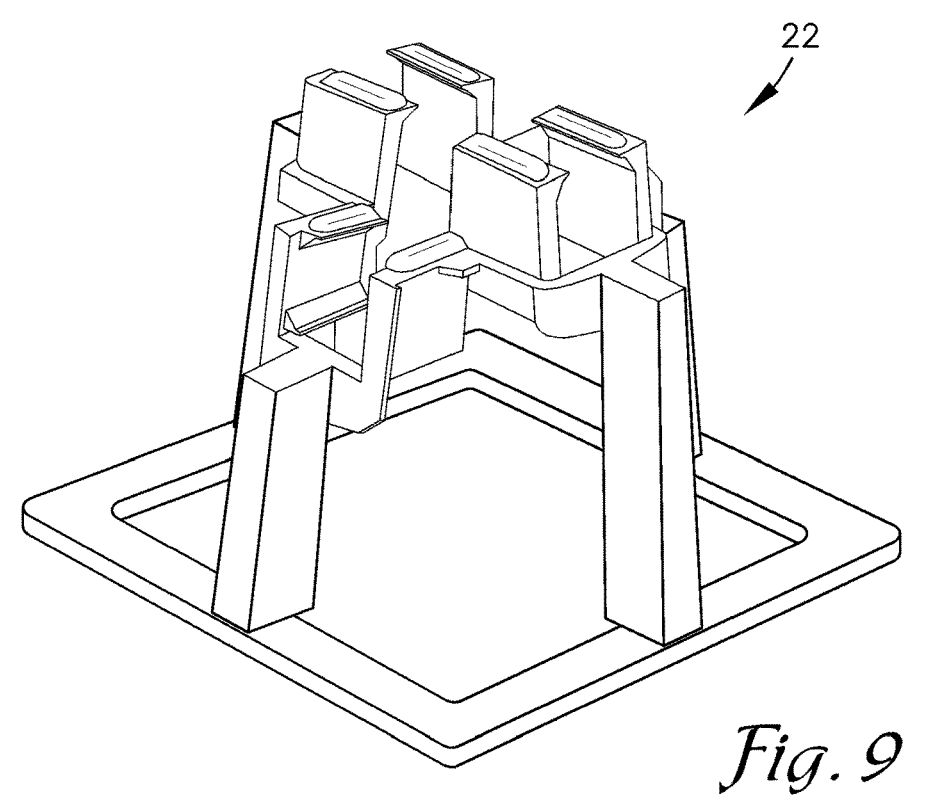
FIG. 9 is a perspective view of a rebar chair.

In some embodiments, each thermal conduction coupler 20 includes a rebar chair 22, also known as a rod chair, as shown in FIG. 9. An exemplary rebar chair 22 includes a base, and a plurality of rebar connectors. The base may have a quadrilateral or circular shape. The rebar chair 22 may include four rebar connectors, with each rebar connector including an attachment feature which clips or couples to one reinforcement bar. Each rebar connector may couple to the base through an individual arm, or all of the rebar connectors may couple to the base through a single frame. As noted above, in one or more embodiments, the rebar chair 22 comprises non-magnetic-shielding materials. It should also be noted that rebar chair(s) 22—despite being referred to as "rebar" chair(s)—may nonetheless be positioned between such charger(s) 12 and non-rebar reinforcement layer(s), such as those comprising non-magnetic-shielding or other materials, and/or may themselves comprise composites, other non-ferrous materials and/or materials described elsewhere herein for constructing the reinforcement layer(s) within the scope of the present invention.

Figure 10:
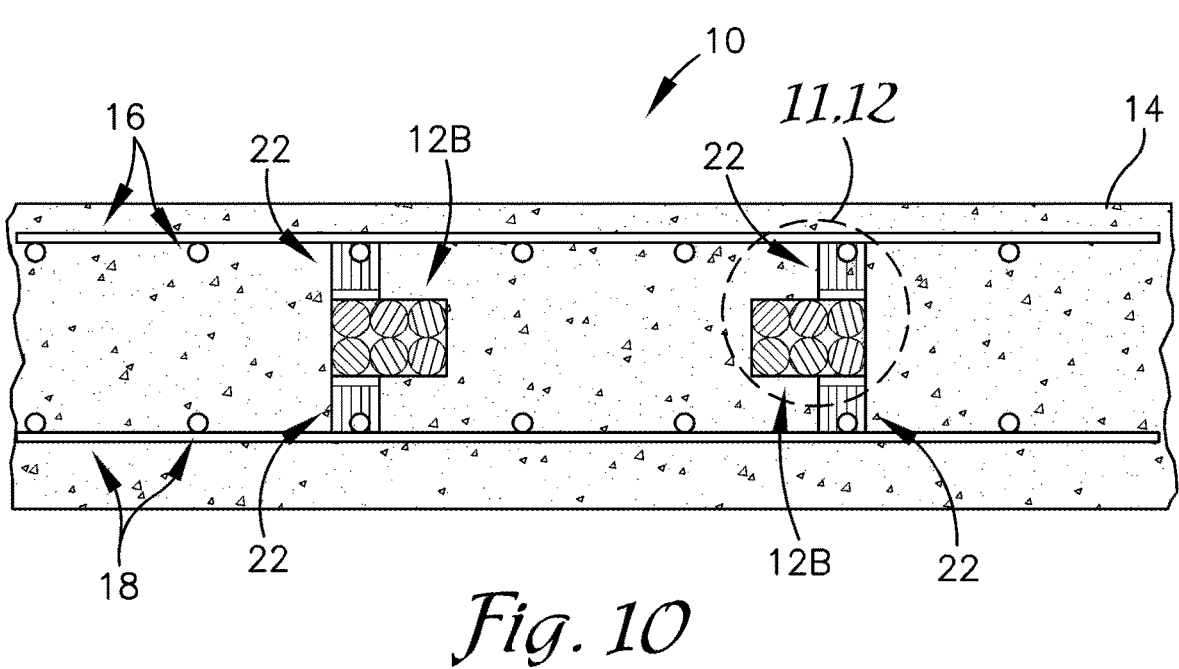
FIG. 10 is a side sectional view of a portion of the roadway section cut along line 10-10 of FIG. 8 illustrating rebar chairs.
Figure 11:
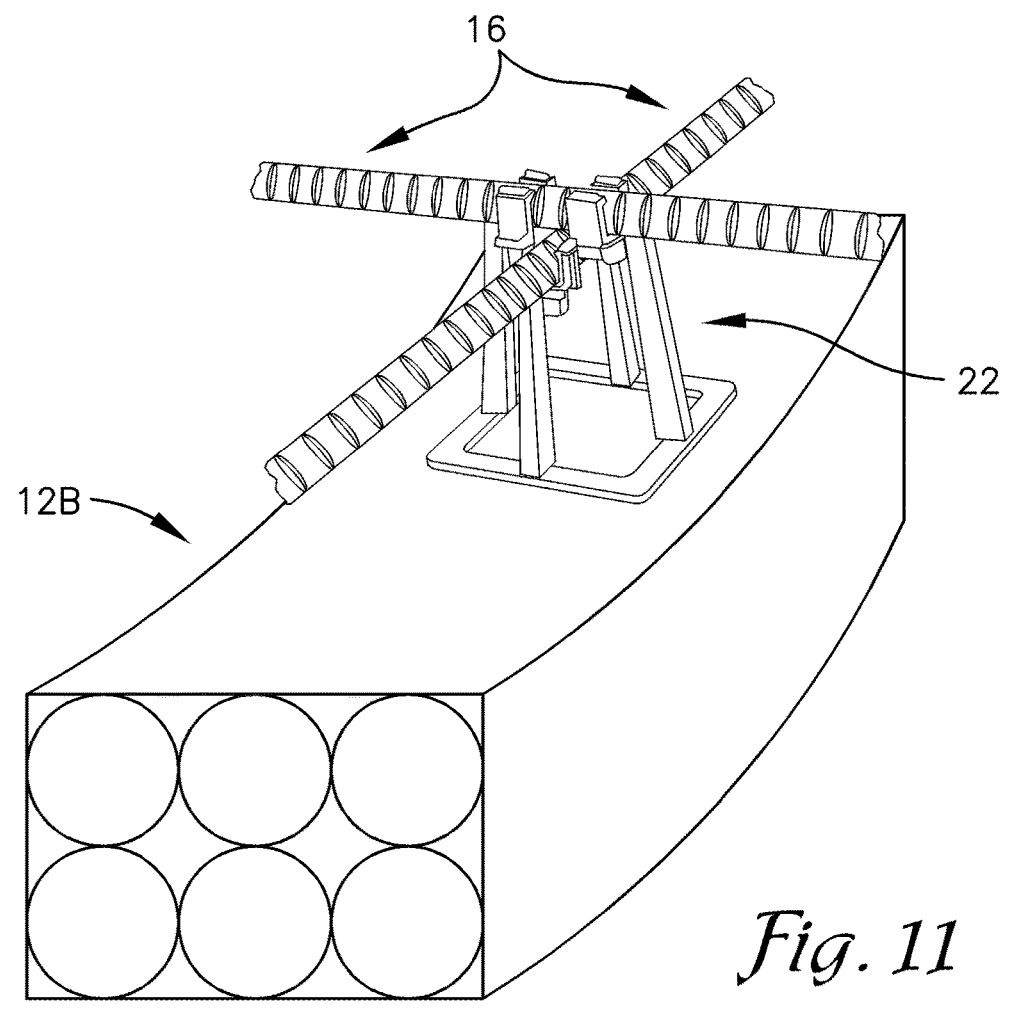
FIG. 11 is a perspective view of a portion of the upper reinforcement layer, the rebar chair, and one wireless battery charger of FIG. 8.

Referring to FIGS. 10 and 11, each rebar chair 22 is positioned on the wireless battery charger 12 so that the base contacts the upper surface or the opposite lower surface. Each rebar connector is coupled to, and/or in contact with, one reinforcement bar. Generally, each rebar chair 22 is positioned in alignment with a successive one of the intersections of the reinforcement bars of the lattice or grid of the upper reinforcement layer 16 or of the lower reinforcement layer 18 such that two of the rebar connectors couple to, and/or are in contact with, a reinforcement bar oriented in the X direction and two of the rebar connectors couple to, and/or are in contact with, a reinforcement bar oriented in the Y direction.

Figure 12:
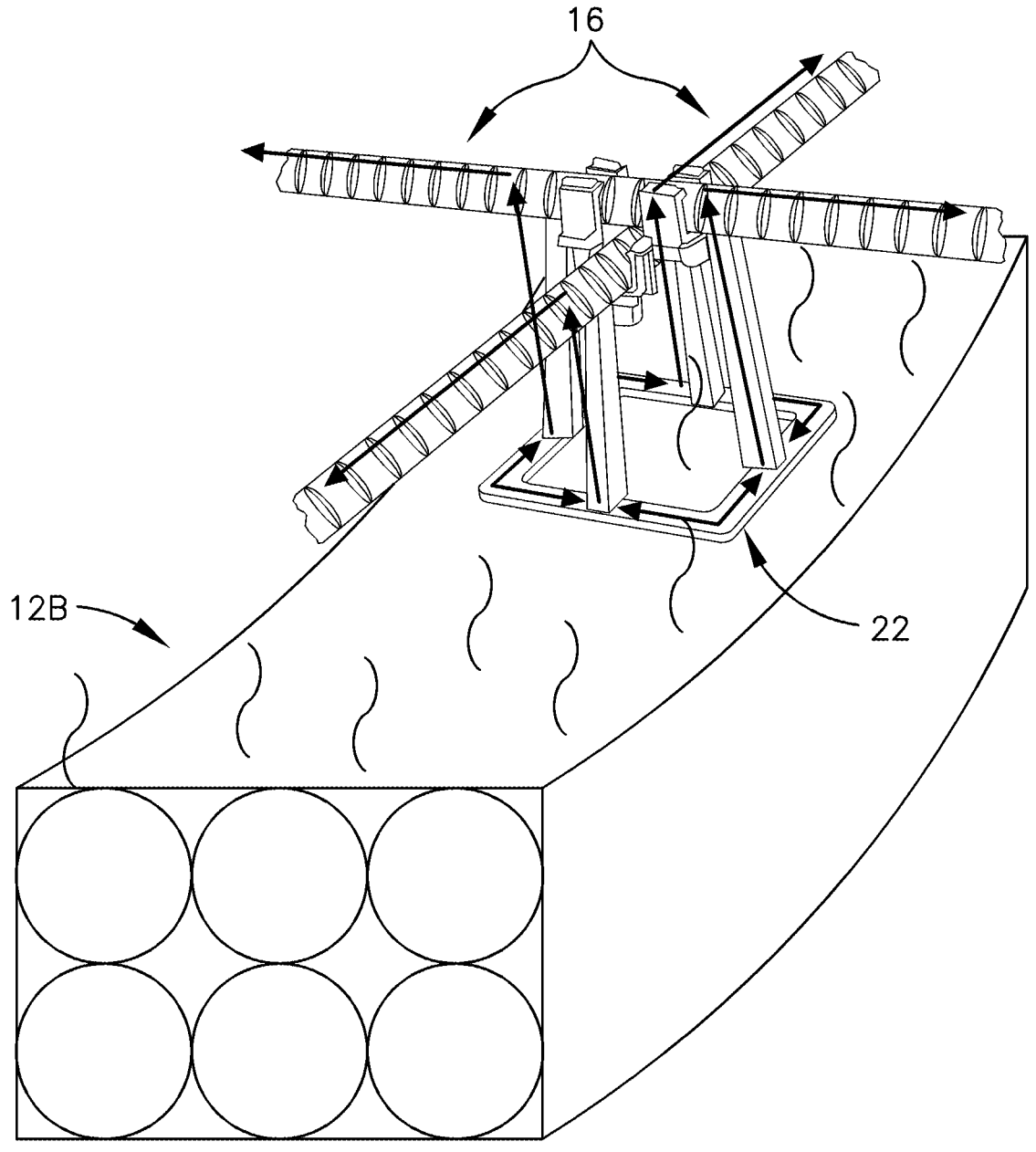
FIG. 12 is a perspective view of the upper reinforcement layer, the rebar chair, and the wireless battery charger of FIG. 11 illustrating a flow of thermal energy.

Referring to FIG. 12, when the wireless battery charger 12 is generating the magnetic field, and as a result, generating heat, the thermal energy flows from the wireless battery charger 12 through the base of the rebar chair 22 and through each rebar connector to the coupled reinforcement bars of the reinforcement layers 16, 18, which conduct and dissipate the heat through the body 14 of the roadway section 10.

In one or more embodiments, each thermal conduction coupler 20 includes a curing leveling foot 24, as shown in FIGS. 13A and 13B. In addition to transferring thermal energy from the wireless battery chargers 12 to the reinforcement layers 16, 18 following manufacture of the section 10, a plurality of curing leveling feet 24 may be utilized during manufacture of (e.g., during a setup and curing process for) the roadway section 10. More particularly, a form and a plurality of internal components of a section 10 may be spaced from one another, and set up and oriented spatially relative to one another. At this stage of setup, the length(s) of one or more of the curing leveling feet 24 may be adjusted to alter the height of respective portion(s) of a wireless battery charger 12 relative to a lower reinforcement layer 18, and/or of an upper reinforcement layer 16 relative to a wireless battery charger 12. This localized adjustment of such internal components may permit proper leveling and/or spacing, for example. Once the internal components are set up within or otherwise relative to the form and other internal components, pavement material (such as concrete) may be poured around the internal components within the form. The resulting assemblage may then be cured to harden the pavement material to form the section 10.

In the illustrated embodiment, the curing leveling foot 24 includes a bolt component 26 and a nut component 28. Each component 26, 28 includes a disc and a threaded cylinder connected thereto. The disc may include a plurality of openings through which corresponding fasteners may be placed to fasten the disc to another object (e.g., to a reinforcement layer 16, 18 or to the wireless battery charger 12). The bolt component 26 includes a male threaded cylinder with threads on an exterior circumferential surface. The nut component 28 includes a female threaded cylindrical side wall with threads on an interior circumferential surface. The nut component 28 may further include one or more axially extending openings on the side wall, permitting ingress of pavement material prior to the curing process outlined above and resultant increased structural integrity throughout the life of the section 10. The bolt component 26 is coupled to and threadably and rotatably engaged with the nut component 28, such that the threaded cylinder of the bolt component 26 is positioned within the threaded cylinder of the bolt component 26. A length of the curing leveling foot 24 may be adjusted by rotating the bolt component 26 and/or the nut component 28, thereby raising or lowering one of the discs and the corresponding internal component of the section 10 sitting on and/or attached thereto (e.g., a portion of a wireless battery charger 12 or upper reinforcement layer 16).

Figure 15:
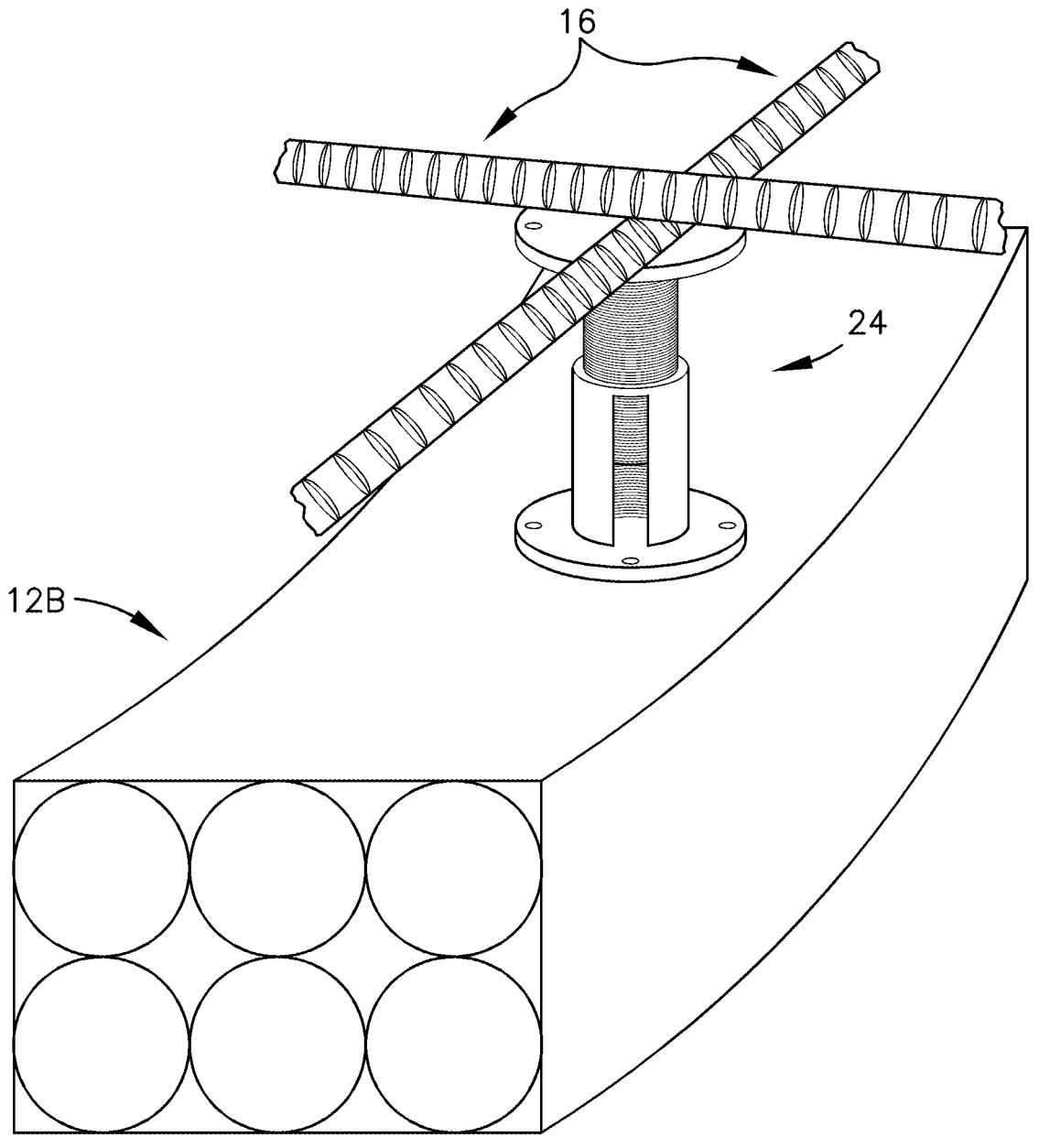
FIG. 15 is a perspective view of the upper reinforcement layer, the curing leveling foot, and one wireless battery charger.

Referring to FIGS. 14 and 15, each curing leveling foot 24 is positioned on the wireless battery charger 12 so that a first disc of either the bolt component 26 or the nut component 28 contacts the upper surface or the lower surface of the charger 12. After the length adjustment and corresponding leveling/spacing operations described above, fasteners, such as screws, may be used to attach the disc to the surface of the wireless battery charger 12. A second, opposing disc of each curing leveling foot 24 is in contact with one of the reinforcement bars of the lattice or grid of the upper reinforcement layer 16 or the lower reinforcement layer 18, and may also or alternatively be attached thereto with one or more fasteners.

One of ordinary skill will appreciate that other fasteners, such as clips, may be used to attach the disc(s) to corresponding portions of a reinforcement layer 16 or 18 and/or to a wireless battery charger 12 within the scope of the present invention. Moreover, and advantageously, the illustrative curing leveling foot 24 may permit a first disc thereof to be attached to a corresponding one of the reinforcement layers 16, 18 and charger 12, followed by a length adjustment for leveling/spacing, followed by attachment of an opposite second disc of the curing leveling foot 24 to its corresponding one of the reinforcement layers 16, 18 and charger 12.

Figure 16:
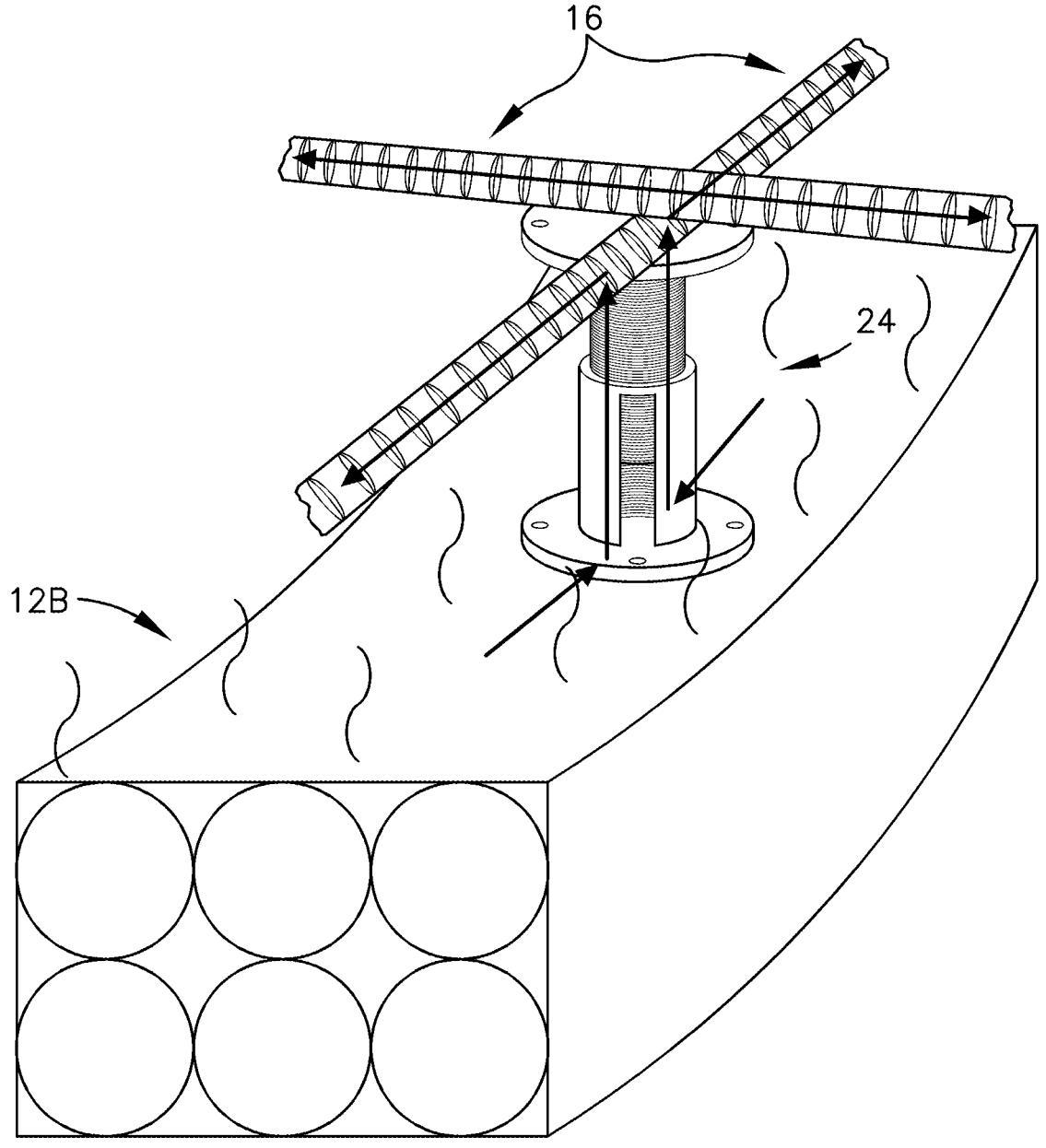
FIG. 16 is a perspective view of the upper reinforcement layer, the curing leveling foot, and one wireless battery charger illustrating a flow of thermal energy.

Referring to FIG. 16, when the wireless battery charger 12 is generating the magnetic field, and as a result, generating heat, the thermal energy flows from the wireless battery charger 12 through the first disc of the curing leveling foot 24, through the two threaded cylinders, and through the second disc to the reinforcement bars of the respective reinforcement layers 16, 18, which conduct and dissipate the heat through the body 14 of the roadway section 10.

In one or more embodiments, the thermal conduction coupler 20 also or alternatively includes a roadway section leveling foot assembly 30, as shown in FIGS. 17-20. The roadway section leveling foot assembly 30 includes a roadway section leveling foot 32 and a plurality of connecting arms 34. In addition to transferring thermal energy from the reinforcement layers 16, 18 to the ground beneath the roadway section 10, a plurality of roadway section leveling feet 32 are utilized during the process of positioning a plurality of roadway sections 10 on the ground to form the pavement system. The roadway section leveling feet 32 are utilized to ensure that each roadway section 10 is level.

Figure 17:
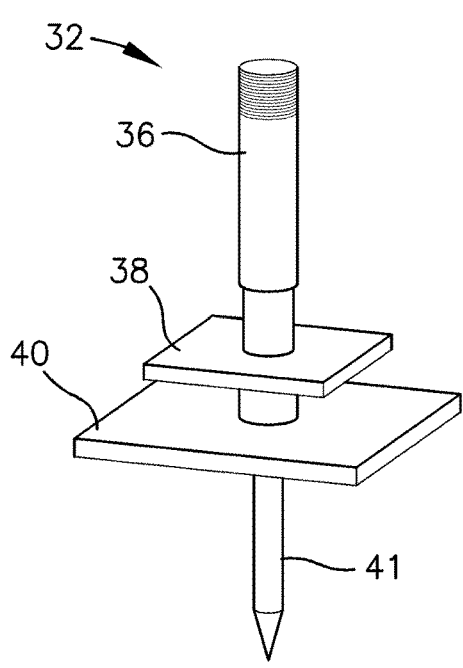
FIG. 17 is a perspective view of a roadway section leveling foot in accordance with an embodiment of the present invention.

Referring to FIG. 17, the roadway section leveling foot 32 includes a column 36, a body foot 38, and a base foot 40. The column 36 includes a generally vertically oriented hollow elongated shaft which retains an axial motion mechanism. The body foot 38 includes a polygon-shaped plate connected to the column 36 at a non-zero distance away from a first or top end of the column 36. The body foot 38 is fixedly or rigidly positioned and/or embedded in the body 14, and in one or more embodiments is fixed to a reinforcement layer 16 or 18. The base foot 40 includes a polygon-shaped plate, of a larger size than the body foot 38, connected to the column 36 at the first end. The base foot 40 is positioned adjacent to or in contact with a lower surface of the body 14. In general, rotation of the axial motion mechanism extends or retracts the column 36 between the body foot 38 and the base foot 40—which moves the base foot 40 toward, or away from, the body foot 38. When the roadway section leveling foot 32 is implemented in the roadway section 10, the base foot 40 sits on a ground or subgrade surface and rotation of the axial motion mechanism moves the base foot 40 toward, or away from, the lower surface of the body 14, which raises or lowers a portion of the body of the roadway section 10 with respect to the ground or subgrade beneath the roadway section 10 for leveling or other height adjustment of the section 10.

The exemplary leveling foot 32 additionally includes an optional spike 41 driven into the ground or subgrade beneath the section 10, permitting enhanced thermal heat transfer thereto and reducing slippage of the leveling foot 32 during leveling operations.

Figure 18:
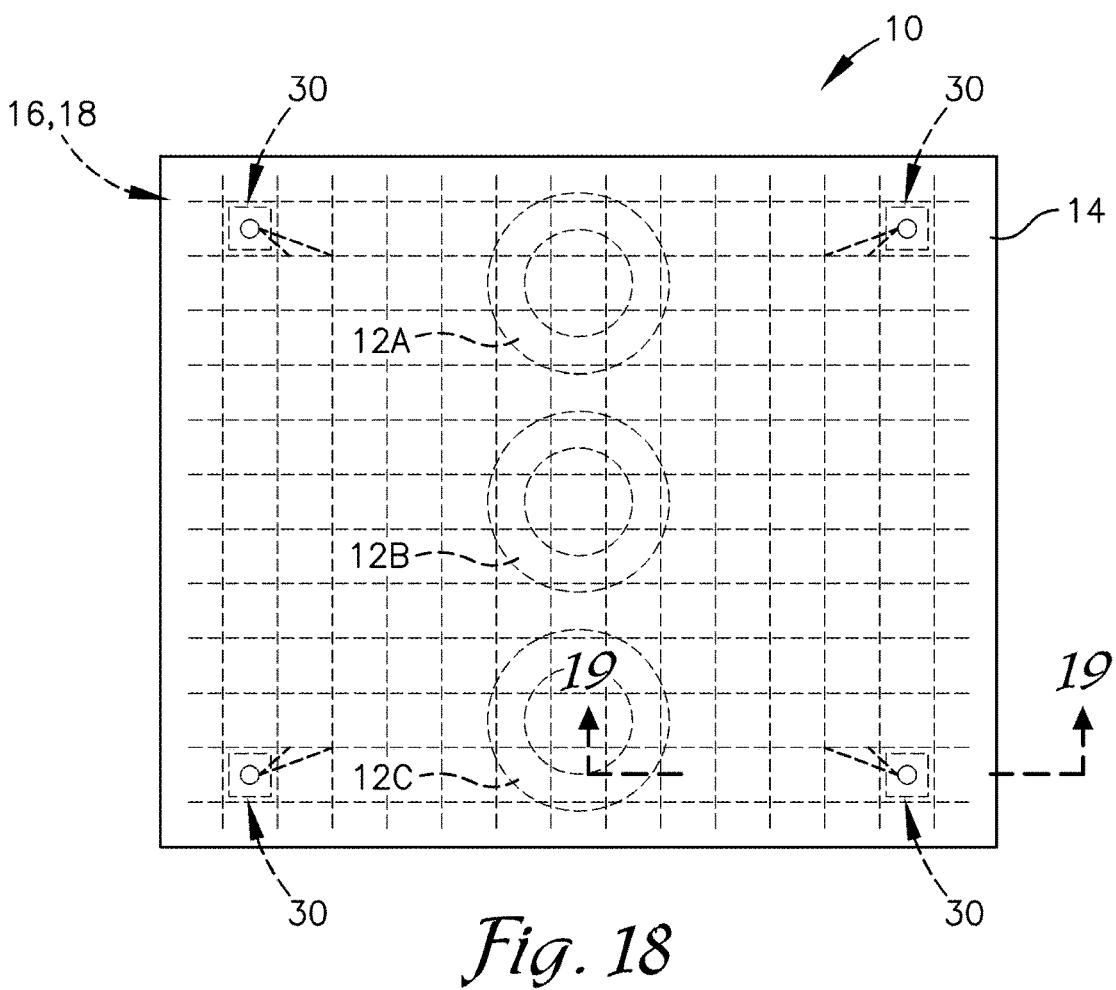
FIG. 18 is a top plan view of the roadway section of FIG. 17 illustrating various components embedded within the body of the roadway section including a plurality of roadway section leveling feet.
Figure 19:
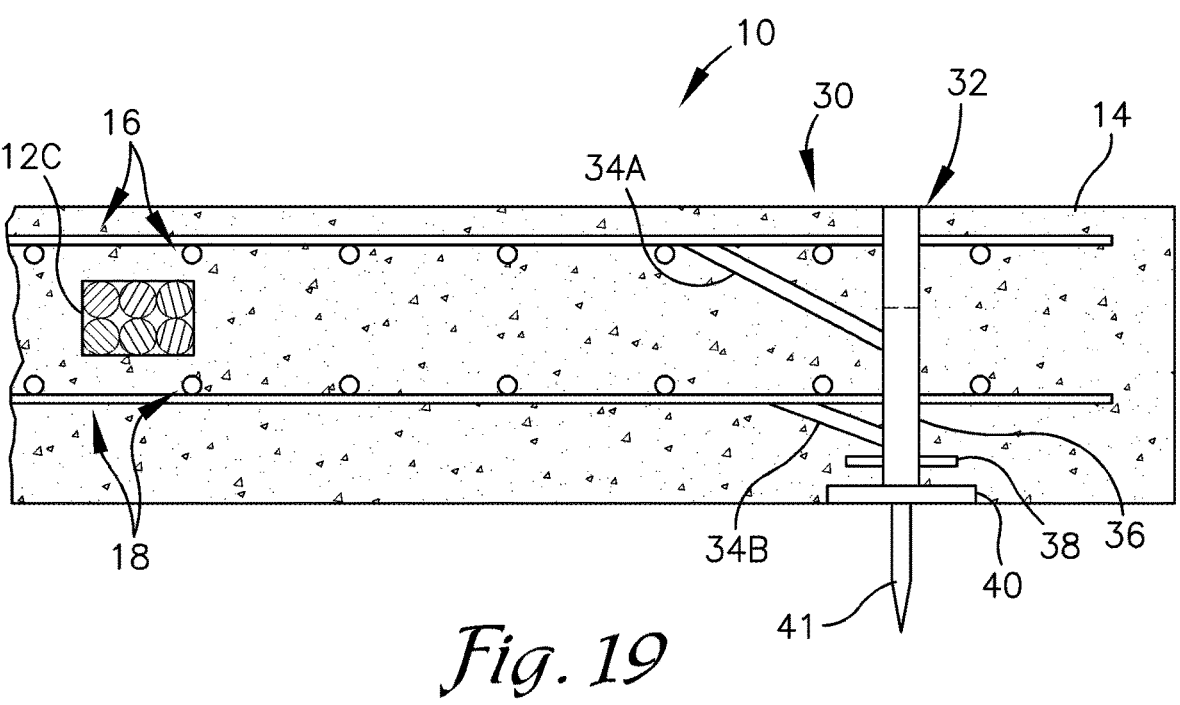
FIG. 19 is a partial side sectional view of the roadway section cut along line 19-19 of FIG. 18.

Referring to FIGS. 18 and 19, an exemplary embodiment of the roadway section leveling foot assembly 30 includes a first connecting arm 34A and a second connecting arm 34B. Other embodiments may include more or fewer connecting arms 34 and still fall within the scope of the current invention. Each connecting arm 34 includes an elongated shaft formed from thermally conductive materials. The first connecting arm 34A is attached to an upper portion of the column of the roadway section leveling foot 32 and extends outward. The second connecting arm 34B is attached to a lower portion of the column and extends outward. Each connecting arm 34 may be attached to the column 36 at a non-horizontal angle, and may include a proximal end positioned nearer (or, in some embodiments in contact with) a wireless battery charger 12 than the leveling foot 32.

Referring to FIG. 18, one of the roadway section leveling foot assemblies 30 is positioned in the vicinity of each of the corners of the roadway section 10. Referring to FIG. 19, for each roadway section leveling foot assembly 30, the first connecting arm 34A is connected to one of the reinforcement bars of the lattice or grid of the upper reinforcement layer 16—preferably one of the reinforcement bars which passes over one of the wireless battery chargers 12. In one or more embodiments, the point of attachment of the proximal end of the arm 34A is not more than five (5) inches, not more than three (3) inches, or not more than one (1) inch from the wireless battery charger 12 and/or the conductive element thereof. The second connecting arm 34B is connected to one of the reinforcement bars of the lattice or grid of the upper reinforcement layer 16—preferably one of the reinforcement bars which passes under one of the wireless battery chargers 12. In one or more embodiments, the point of attachment of the proximal end of the arm 34B is not more than five (5) inches, not more than three (3) inches, or not more than one (1) inch from the wireless battery charger 12 and/or the conductive element thereof.

Figure 20:
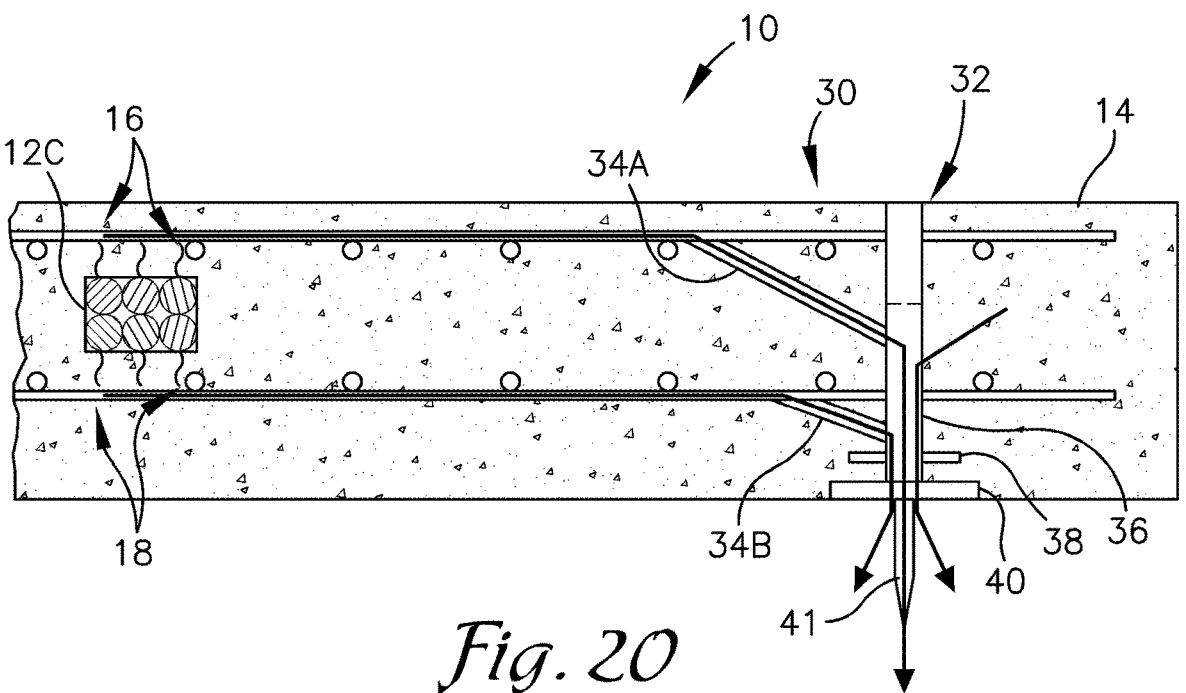
FIG. 20 is a partial side sectional view of the roadway section cut along line 19-19 of FIG. 18 illustrating a flow of thermal energy.

Referring to FIG. 20, when the wireless battery charger 12 is generating the magnetic field for wireless battery charging, and as a result, generating heat, the thermal energy flows from the wireless battery charger 12 through the body 14 of the roadway section 10 (or, in some embodiments, through thermal conduction coupler(s) 20) to the upper reinforcement layer 16, the lower reinforcement layer 18 and/or the arm(s) 34A and/or 34B. The thermal energy may travel and be conducted along the reinforcement bars of the lattice or grid of the upper reinforcement layer 16 and the lower reinforcement layer 18 to the respective connecting arms 34. The thermal energy may travel along the connecting arms 34 through the column 36 and the base foot 40 to the ground (earth) or subgrade beneath the roadway section 10, thereby dissipating the heat. Thermal energy may also dissipate from other parts of the body 14 to the column 36. In addition, thermal energy may dissipate into the body 14 from the upper reinforcement layer 16 and the lower reinforcement layer 18 and other components of the accelerated heat transfer path described herein. It should also be noted that arm(s) 34A and/or 34B may extend from a point proximate or in contact with the wireless battery charger 12 and/or the conductive element thereof to a point proximate or in contact with a corresponding one of the reinforcement layer(s) 16, 18 and/or leveling foot 32 within the scope of the present invention.

Figure 21:
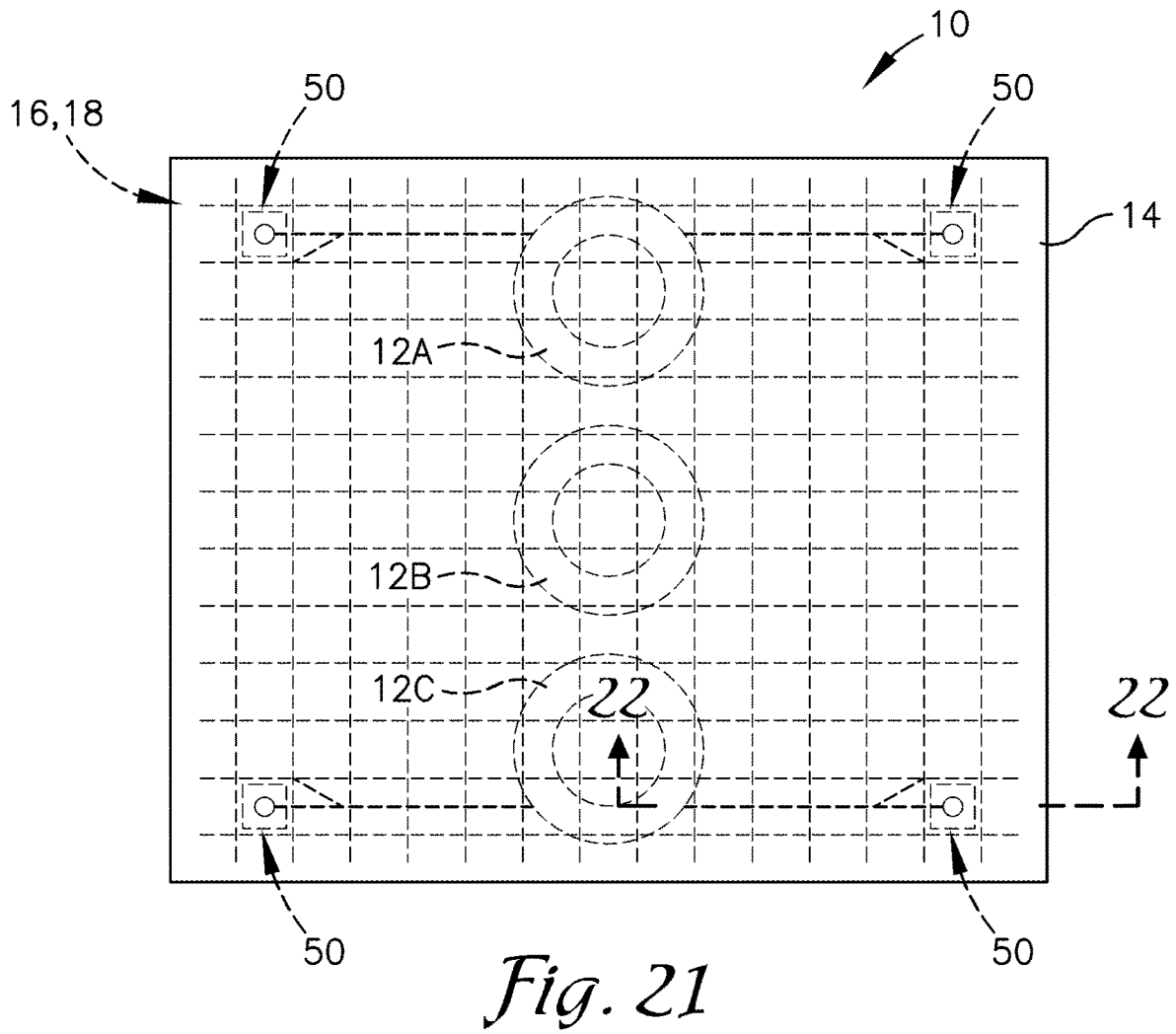
FIG. 21 is a top plan view of the roadway section of FIG. 18 illustrating various components embedded within the body of the roadways section including another embodiment of roadway section leveling feet.
Figure 22:
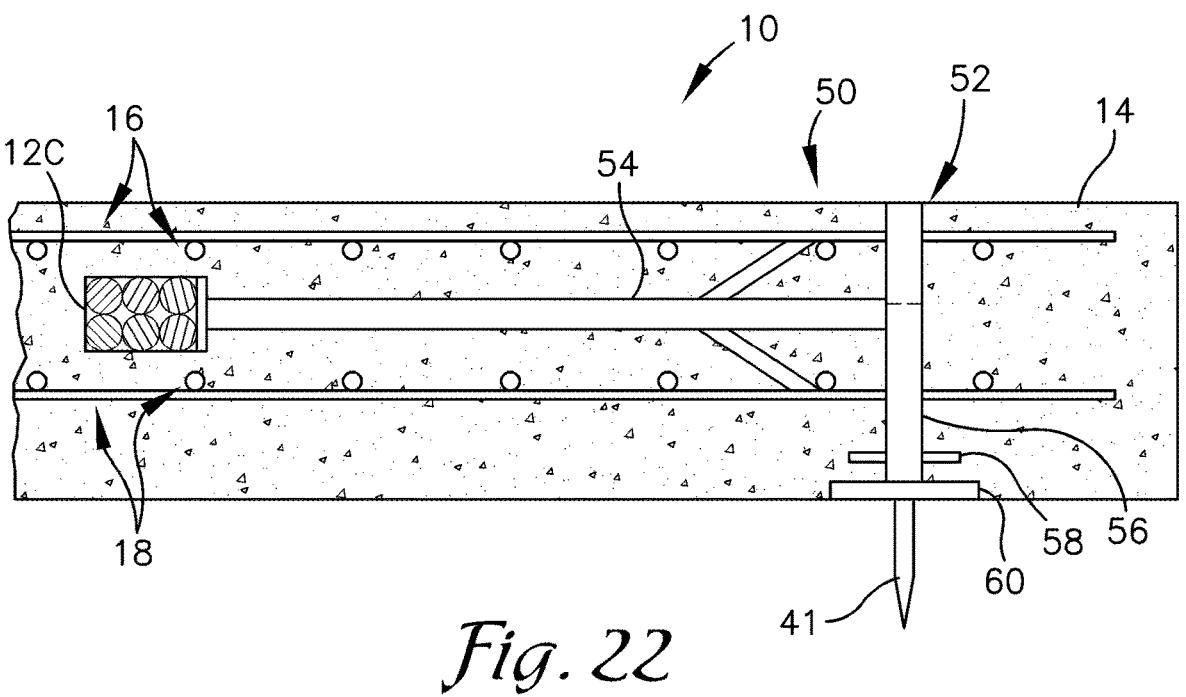
FIG. 22 is a partial side sectional view of the roadway section cut along line 22-22 of FIG. 21.

Referring to FIGS. 21 and 22, a second embodiment of the roadway section leveling foot assembly 50 includes a roadway section leveling foot 52 and at least one connecting arm 54. The roadway section leveling foot 52 is the same as, or substantially similar to, the roadway section leveling foot 32 and includes a column 56, a body foot 58, and a base foot 60 with similar structure and function to the like-named components described above. The connecting arm 54 is similar to either of the connecting arms 34A, B in that the connecting arm 54 likewise includes an elongated shaft formed from thermally conductive material extending between the wireless battery charger 12 and the leveling foot 52. In various embodiments, the connecting arm 54 includes a plurality of extensions which couple to the upper reinforcement layer 16 and the lower reinforcement layer 18. As shown in FIG. 22, the connecting arm 54 includes a first extension coupled to the upper reinforcement layer 16 and a second extension coupled to the lower reinforcement layer 18. The connecting arm 54 may further include a plate or planar component coupled to a first, proximal end thereof and in thermal conductive contact with and/or proximate to the wireless battery charger 12. A second end of the connecting arm 54 is attached to the column 56, e.g., in an orthogonal relationship.

Referring to FIG. 21, one of the roadway section leveling foot assemblies 50 is positioned in the vicinity of each of the corners of the roadway section 10. In the exemplary embodiment, two roadway section leveling foot assemblies 50 are coupled to the first wireless battery charger 12A, and two roadway section leveling foot assemblies 50 are coupled to the third wireless battery charger 12C. Referring to FIG. 22, for each roadway section leveling foot assembly 50, the plate of the connecting arm 54 is connected or proximate to a side surface of one wireless battery charger 12.

In other embodiments, the connecting arms 54 may be implemented or arranged in a different configuration. For example, the connecting arm 54 of one or more roadway section leveling foot assemblies 50 may be coupled to, in contact with, or proximate to the second wireless battery charger 12B. In addition, each roadway section leveling foot assembly 50 may include additional connecting arms 54. For example, each roadway section leveling foot assembly 50 may include two or more connecting arms 54, with each connecting arm 54 having an end coupled to, in contact with, or proximate to a successive one of the wireless battery chargers 12. Furthermore, the thermal conduction coupler 20 may include a different number of roadway section leveling foot assemblies 50. For example, the thermal conduction coupler 20 may include six roadway section leveling foot assemblies 50, with four of the roadway section leveling foot assemblies 50 configured or arranged as they are in FIG. 21. The two remaining roadway section leveling foot assemblies 50 may positioned on either side of the second wireless battery charger 12B, in a similar manner as the other four roadway section leveling foot assemblies 50 are with the first wireless battery charger 12A and the third wireless battery charger 12C. Also or alternatively, one or more embodiments may include thermal conduction couplers 20 conducting thermal energy between wireless battery charger 12B (and, optionally, chargers 12A, C) and the reinforcement layer(s) 16 and/or 18, and arms 34 and/or 54 conducting thermal energy between each of the wireless battery chargers 12A, C and/or adjacent portions of the reinforcement layer(s) 16 and/or 18 and the respective leveling feet 52.

Figure 23:
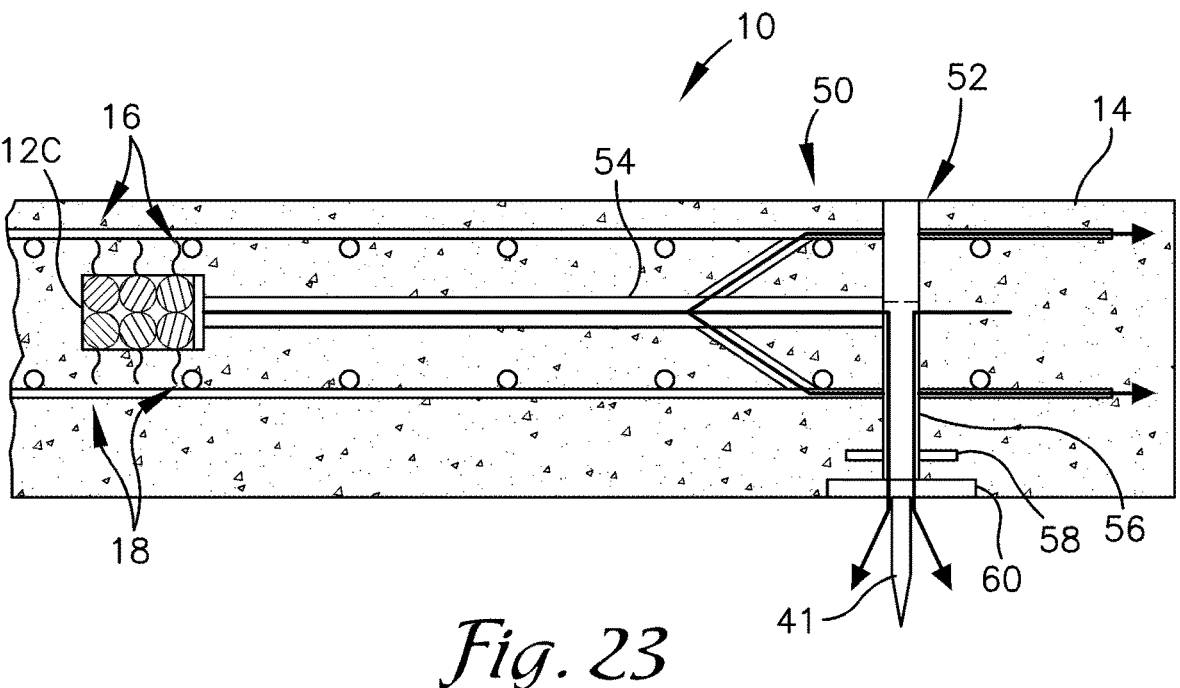
FIG. 23 is a partial side sectional view of the roadway section cut along line 22-22 of FIG. 21 illustrating a flow of thermal energy.

Referring to FIG. 23, when the wireless battery charger 12 is generating the magnetic field for wireless battery charging, and as a result, generating heat, the thermal energy flows from the wireless battery charger 12 through the proximate or connected plate and along the length of the connecting arm 54 to the column 56. A portion of the thermal energy may also travel along the first extension to the upper reinforcement layer 16, which dissipates the heat, and the second extension to the lower reinforcement layer 18, which dissipates the heat. Another portion of the thermal energy travels through the column 56 and the base foot 60 to the ground (earth) or subgrade beneath the roadway section 10, which dissipates the heat. Thermal energy may also dissipate from other parts of the body 14 to the column 56.

Figure 24:
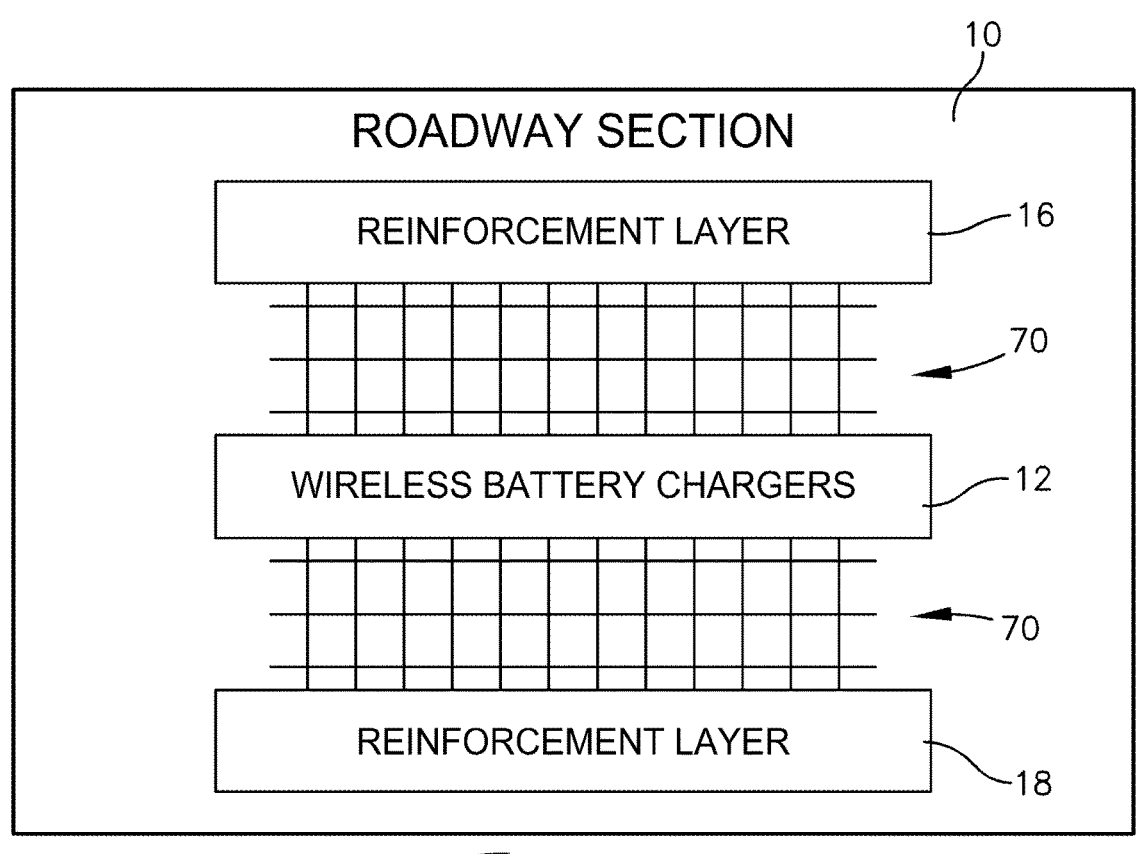
FIG. 24 is a schematic block diagram of upper and lower reinforcement layers, wireless battery chargers, and a first alternative embodiment of the thermal conduction coupler.

In one or more embodiments, the thermal conduction coupler 20 includes a wire mesh 70, as shown in FIG. 24. The wire mesh 70 may include a weave of wires, with each wire being formed from thermally conductive material. For the wire mesh 70 positioned above the wireless battery chargers 12, the wires may be formed from non-ferrous and/or non-magnetic-shielding thermally conductive material. In some embodiments, the wire mesh 70 may include a single woven layer that forms a cylindrical wall of roughly the same diameter as each wireless battery charger 12. Thus, the thermal conduction coupler 20 may include six wire meshes 70, with a successive one of the wire meshes 70 positioned on the upper surface and the lower surface of each wireless battery charger 12 such that a portion of the wire mesh 70 contacts the surfaces of the wireless battery charger 12. In addition, a portion of the wire mesh 70 contacts one or more reinforcement bars of the lattice or grid of the upper reinforcement layer 16 and/or the lower reinforcement layer 18. When the wireless battery chargers 12 are generating the magnetic field, and as a result, generating heat, the thermal energy flows from the wireless battery chargers 12 through each wire mesh 70 to the upper reinforcement layer 16 and/or the lower reinforcement layer 18 which dissipate(s) the heat through the body 14 of the roadway section 10.

Figure 25:
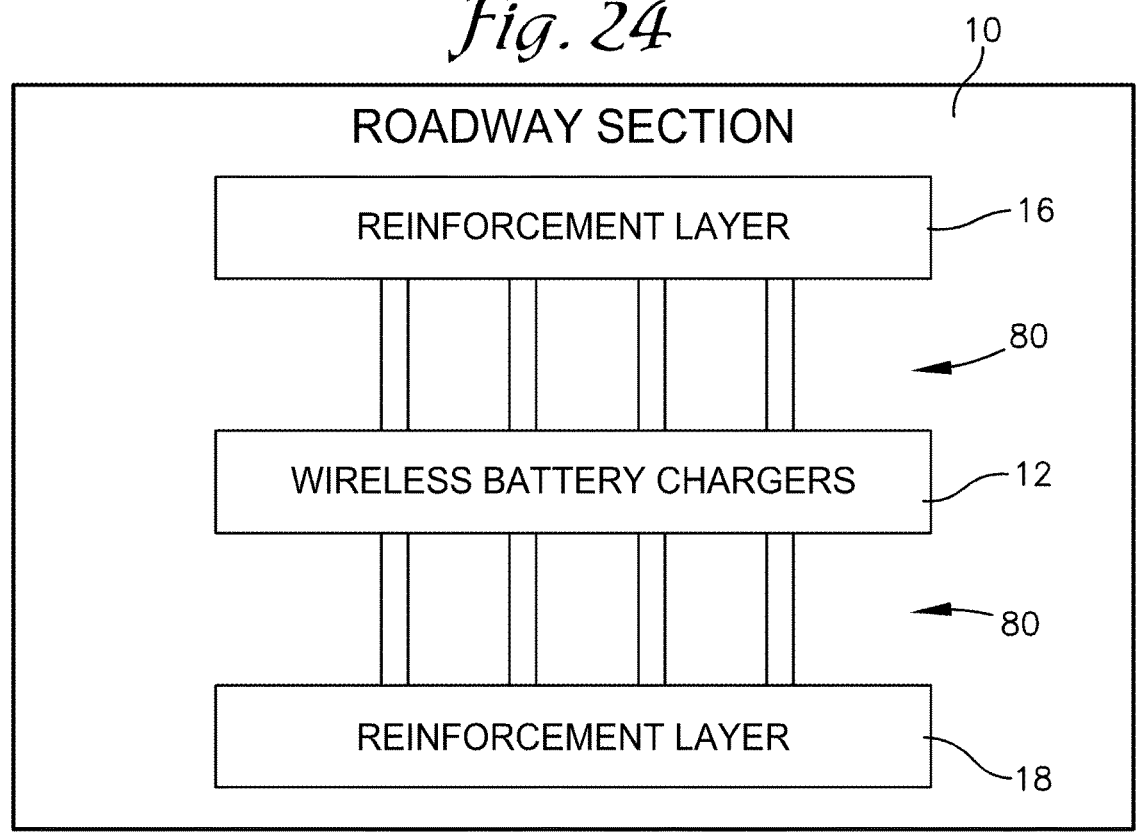
FIG. 25 is a schematic block diagram of upper and lower reinforcement layers, wireless battery chargers, and a second alternative embodiment of the thermal conduction coupler.

In still other embodiments, the thermal conduction coupler 20 includes a plurality of bars 80, as shown in FIG. 25. Each bar 80 may have a rectangular box shape or an elongated cylindrical shape and be formed from thermally conductive material. For the bars 80 positioned above the wireless battery chargers 12, the bars 80 may be formed from non-ferrous and/or non-magnetic-shielding thermally conductive material. In some embodiments, each bar 80 may include a reinforcement bar. Each bar 80 may be positioned in a vertical orientation such that a first end contacts or is proximate to the upper surface or the lower surface of one of the wireless battery chargers 12 and a second end contacts or is proximate to one of the reinforcement bars of the lattice or grid of the upper reinforcement layer 16 or the lower reinforcement layer 18. When the wireless battery chargers 12 are generating the magnetic field for wireless battery charging, and as a result, generating heat, the thermal energy flows from the wireless battery chargers 12 through each bar 80 to the upper reinforcement layer 16 or the lower reinforcement layer 18 which dissipate the heat through the body 14 of the roadway section 10.

ADDITIONAL CONSIDERATIONS

Throughout this specification, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current invention can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112 (f) unless traditional means-plus-function language is expressly recited, such as "means for" or "step for" language being explicitly recited in the claim(s).

Although the technology has been described with reference to the embodiments illustrated in the attached drawing figures, it is noted that equivalents may be employed and substitutions made herein without departing from the scope of the technology as recited in the claims.

Having thus described various embodiments of the technology, what is claimed as new and desired to be protected by Letters Patent includes the following:

The invention claimed is:

1. A roadway section comprising:
   a body of rigid pavement;
   a reinforcement layer embedded in and configured to provide structural integrity to the body;
   a wireless battery charger embedded in the body and configured to induce an electrical charge on a battery of a vehicle traveling on the roadway section; and
   a thermal conduction coupler embedded in the body and extending between the wireless battery charger and a portion of the reinforcement layer, the thermal conduction coupler being configured to conductively transfer heat from the wireless battery charger to the reinforcement layer.

2. The roadway section of claim 1, wherein the thermal conduction coupler includes a bar that contacts the reinforcement layer and the wireless battery charger and is formed from thermally conductive material.

3. The roadway section of claim 2, wherein the bar comprises non-magnetic-shielding material.

4. The roadway section of claim 1, wherein the thermal conduction coupler includes a woven wire mesh.

5. The roadway section of claim 1, wherein the thermal conduction coupler includes a rebar chair formed from thermally conductive material that has a base contacting the wireless battery charger and a plurality of rebar connectors, one or more of the plurality of rebar connectors contacting the reinforcement layer.

6. The roadway section of claim 1, wherein the reinforcement layer includes a grid of reinforcement bars.

7. The roadway section of claim 1, wherein the thermal conduction coupler includes a structure that contacts the reinforcement layer and the wireless battery charger and the structure is formed from thermally conductive material.

8. The roadway section of claim 1, wherein the reinforcement layer is positioned between the wireless battery charger and a top surface of the body and the reinforcement layer is formed from non-magnetic-shielding material.

9. The roadway section of claim 8, wherein the thermal conduction coupler is formed from non-magnetic-shielding material.

10. The roadway section of claim 1, wherein the reinforcement layer is positioned between the wireless battery charger and a bottom surface of the body and the reinforcement layer is formed from non-ferrous material.

11. The roadway section of claim 1, wherein the thermal conduction coupler has a thermal conductivity value that is greater than the thermal conductivity value of concrete.

12. The roadway section of claim 1, wherein the thermal conduction coupler has a thermal conductivity value greater than five watts per meter-kelvin.

13. The roadway section of claim 1, wherein the thermal conduction coupler includes a curing leveling foot having an adjustable length to control spacing between the reinforcement layer and the wireless battery charger prior to curing of pavement material comprising the rigid body.

14. The roadway section of claim 1, wherein the thermal conduction coupler includes a proximal end that is within one inch of the wireless battery charger.

15. The roadway section of claim 1, wherein the thermal conduction coupler includes a bar that contacts the reinforcement layer and one of the wireless battery chargers and is formed from thermally conductive material.

16. The roadway section of claim 1, wherein the thermal conduction coupler includes a woven wire mesh.

17. The roadway section of claim 1, wherein the thermal conduction coupler includes a curing leveling foot having a bolt component rotationally coupled to a nut component such that rotation of the bolt component, the nut component, or both adjusts a height of the curing leveling foot.

18. A roadway section comprising:

a body of rigid pavement;

a plurality of wireless battery chargers embedded in the body, each wireless battery charger configured to induce an electrical charge on a battery of a vehicle traveling on the roadway section;

an upper reinforcement layer embedded in the body and positioned above the wireless battery chargers, the upper reinforcement layer formed from non-ferrous material and configured to provide structural integrity to the body;

a lower reinforcement layer embedded in the body and positioned below the wireless battery chargers, the lower reinforcement layer configured to provide structural integrity to the body;

a plurality of first rebar chairs embedded in the body, the first rebar chairs formed from non-ferrous material and configured to conductively transfer heat from the wireless battery chargers to the upper reinforcement layer; and a plurality of second rebar chairs embedded in the body, the second rebar chairs configured to conductively transfer heat from the wireless battery chargers to the lower reinforcement layer.

19. The roadway section of claim 18, wherein each first rebar chair and each second rebar chair includes a base positioned in contact with a surface of a corresponding one of the wireless battery chargers.

20. The roadway section of claim 18, wherein the upper reinforcement layer includes a grid of reinforcement bars, each first rebar chair includes a rebar connector in contact with one or more of the reinforcement bars of the upper reinforcement layer, the lower reinforcement layer includes a grid of reinforcement bars, and each second rebar chair includes a rebar connector in contact with one or more of the reinforcement bars of the lower reinforcement layer.

* * * * *